(12) United States Patent
Harris et al.

(10) Patent No.: US 7,716,377 B2
(45) Date of Patent: May 11, 2010

(54) CLUSTERING SERVER PROVIDING VIRTUAL MACHINE DATA SHARING

(76) Inventors: Steven T. Harris, 255 Berry St., Suite 106, San Francisco, CA (US) 94107; Orion D. Letizi, 260 King St., #1011, San Francisco, CA (US) 94107; Saravanan Subbiah, 1396 El Camino Real, #204, Millbrae, CA (US) 94030; Timothy S. Eck, 556 Sylvan Ave., San Mateo, CA (US) 94403

( * ) Notice: Subject to any disclaimer, the term of this patent is extended or adjusted under 35 U.S.C. 154(b) by 299 days.

(21) Appl. No.: 11/420,446

(22) Filed: May 25, 2006

(65) Prior Publication Data

US 2007/0088762 A1    Apr. 19, 2007

Related U.S. Application Data

(60) Provisional application No. 60/684,610, filed on May 25, 2005.

(51) Int. Cl.
*G06F 15/173* (2006.01)
(52) U.S. Cl. ...................................... 709/248
(58) Field of Classification Search .............. 707/200; 709/200, 248
See application file for complete search history.

(56) References Cited

U.S. PATENT DOCUMENTS

| 5,291,597 A |   | 3/1994 | Shorter et al. |
| 5,613,060 A |   | 3/1997 | Britton et al. |
| 5,666,514 A | * | 9/1997 | Cheriton ............. 711/144 |
| 5,845,298 A |   | 12/1998 | O'Connor et al. |
| 5,857,210 A |   | 1/1999 | Tremblay et al. |
| 5,873,104 A |   | 2/1999 | Tremblay et al. |
| 5,953,736 A |   | 9/1999 | O'Connor et al. |
| 6,003,065 A |   | 12/1999 | Yan et al. |
| 6,014,723 A |   | 1/2000 | Tremblay et al. |
| 6,138,143 A |   | 10/2000 | Gigliotti et al. |
| 6,226,734 B1 |   | 5/2001 | Kleinsorge et al. |
| 6,243,825 B1 |   | 6/2001 | Gamache et al. |

(Continued)

OTHER PUBLICATIONS

Response to Office Action dated Jan. 12, 2009, U.S. Appl. No. 11/442,524, filed May 25, 2006.

(Continued)

*Primary Examiner*—David Y Eng
(74) *Attorney, Agent, or Firm*—Vierra Magen Marcus & DeNiro LLP

(57) ABSTRACT

Technology for sharing data among multiple virtual machines in a cluster of virtual machines is disclosed. Each virtual machine identifies "managed" objects of an instance of an application running at the virtual machine. The managed objects are objects for which state information is to be replicated at the other virtual machines in the cluster on which other instances of the application are running. Operations performed by an instance of one application which affect the state of managed objects are detected and distributed. A computer-implemented method for maintaining consistent object states at different virtual machines includes receiving managed object state information from a first virtual machine including a first instance of an application; creating a representation of each of the managed objects; and responsive to the received information, communicating state information to at least a second virtual machine on which a second instance of the application is running to replicate the state information at the second virtual machine.

21 Claims, 15 Drawing Sheets

U.S. PATENT DOCUMENTS

| | | |
|---|---|---|
| 6,327,594 B1 | 12/2001 | Van Huben et al. |
| 6,330,659 B1 | 12/2001 | Poff et al. |
| 6,385,643 B1 | 5/2002 | Jacobs et al. |
| 6,408,383 B1 | 6/2002 | Tremblay et al. |
| 6,456,893 B1 * | 9/2002 | Nakanishi .................... 700/96 |
| 6,496,917 B1 | 12/2002 | Cherabuddi et al. |
| 6,542,990 B1 | 4/2003 | Tremblay et al. |
| 6,591,278 B1 | 7/2003 | Ernst |
| 6,618,737 B2 | 9/2003 | Aridor et al. |
| 6,684,297 B2 | 1/2004 | Chaudhry et al. |
| 6,701,417 B2 | 3/2004 | Chaudhry et al. |
| 6,718,457 B2 | 4/2004 | Tremblay et al. |
| 6,718,839 B2 | 4/2004 | Chaudhry et al. |
| 6,738,977 B1 | 5/2004 | Berry et al. |
| 6,799,202 B1 | 9/2004 | Hankinson et al. |
| 6,826,757 B2 | 11/2004 | Steele, Jr. et al. |
| 6,862,664 B2 | 3/2005 | Tremblay et al. |
| 6,862,693 B2 | 3/2005 | Chaudhry et al. |
| 6,892,295 B2 | 5/2005 | Saulsbury |
| 6,901,491 B2 | 5/2005 | Kohn et al. |
| 6,938,130 B2 | 8/2005 | Jacobson et al. |
| 7,013,454 B2 | 3/2006 | Bush et al. |
| 7,058,929 B2 | 6/2006 | Charnell et al. |
| 7,222,221 B1 | 5/2007 | Agesen et al. |
| 7,376,078 B1 * | 5/2008 | Amiocangioli et al. ...... 370/217 |
| 2002/0161816 A1 | 10/2002 | Kawahara et al. |
| 2003/0200526 A1 | 10/2003 | Arcand |
| 2003/0226033 A1 | 12/2003 | Zinda et al. |
| 2004/0019670 A1 | 1/2004 | Viswanath |
| 2004/0205377 A1 | 10/2004 | Nakamura et al. |
| 2006/0041885 A1 | 2/2006 | Broquere et al. |

OTHER PUBLICATIONS

Office Action dated Dec. 24, 2008, U.S. Appl. No. 11/442,522, filed May 25, 2006.
International Preliminary Report on Patentability and Written Opinion of the International Searching Authority dated Mar. 31, 2009, International Appl. No. PCT/US2006/020767 filed on May 25, 2006.
Office Action dated Apr. 13, 2009, U.S. Appl. No. 11/442,524, filed May 25, 2006.
Office Action dated Jul. 11, 2008, U.S. Appl. No. 11/442,524, filed May 25, 2006.
Office Action dated Sep. 29, 2009 in U.S. Appl. No. 11/441,676.
Office Action dated Sep. 30, 2009 in U.S. Appl. No. 11/441,605.
Response to Office Action filed Oct. 13, 2009 in U.S. Appl. No. 11/442,524.

* cited by examiner

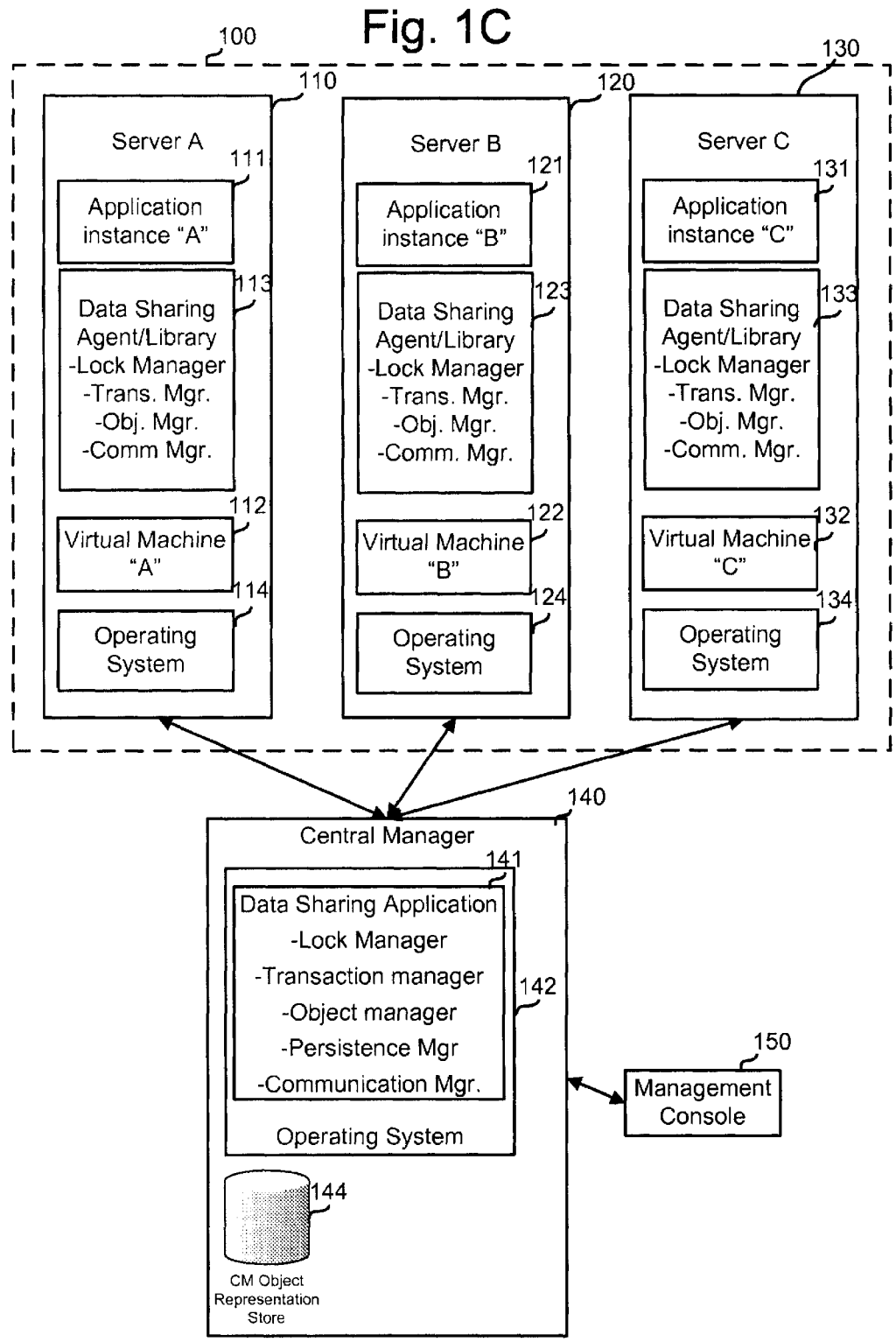

let A, B equal different managed objects.
let P, Q equal different transactions synchronized (A) { getLock(A)

startTransaction(P)  ⎫
    user-defined operations  ⎬ first transaction
    commitTransaction(P)  ⎭ synchronized(B) { getLock(B)

startTransaction(Q)  ⎫
        user-defined operations  ⎬ second transaction
        commitTransaction(Q)  ⎭ releaseLock(B)
    }
    releaseLock(A)
}

Sharing Object ID

CLUSTERING SERVER PROVIDING VIRTUAL MACHINE DATA SHARING

CROSS REFERENCE TO RELATED APPLICATION

This application claims the benefit of U.S. provisional patent application No. 60/684,610, filed May 25, 2005, titled "Terracotta Virtualization Server", and incorporated herein by reference.

The application is also related to the following co-pending applications, each of which is incorporated herein by reference:

(1) U.S. patent application Ser. No. 11/441,677, filed May 25, 2006, titled "Distributed Signaling in a Virtual Machine Cluster";

(2) U.S. patent application Ser. No. 11/441,676, filed May 25, 2006, titled "Creating Clustered Object State Using Synthetic Transactions".

(3) U.S. patent application Ser. No. 11/441,605, filed May 25, 2006, titled "Distributed Object Identity in a Virtual Machine Cluster";

(4) U.S. patent application Ser. No. 11/442,522 filed May 25, 2006, titled "Clustered Object State Using Field Set Operations";

(5) U.S. patent application Ser. No. 11/442,524, filed May 25, 2006, titled "Clustered Object State Using Logical Actions";

(6) U.S. patent application Ser. No. 11/442,523, filed May 25, 2006, titled "Lock Management for Clustered Virtual Machines".

BACKGROUND

Application developers have traditionally faced a number of challenges in horizontally scaling applications to multiple servers. Scaling is particularly useful to World Wide Web application developers who may, for example, require geographically distributed application servers to provide users with better performance. In one example, suppose a user of a web-based application logs on to a web site to change information in an existing user account. Typically, in a distributed application, one application server is selected to handle the transaction based on its geographical location, availability or other factors. The selected server accesses the account data and makes the requested changes locally and the updated data must then be shared with the other servers so that the user's future interactions with any of the servers will reflect the updates. Additionally, the fact that some servers may go offline while others come online must be considered.

This scaling challenge is faced by developers in many development environments, including developers using the popular Java development platform. The Java platform's goal in providing a platform independent environment is generally met by the fact that Java source code is compiled into an intermediate language called "bytecode," which can reside on any hardware platform. In order to run the bytecode, it must be compiled into machine code via a Java Virtual Machine (JVM). A JVM is a platform-independent execution environment that converts Java byte code into machine language and executes it. The JVM provides the developer with the tools necessary for multi-threaded applications, including thread support, synchronization and garbage collection.

FIG. 1A illustrates a traditional implementation of a Java application running on a virtual machine under a given operating system on a processing system or server. As developers have attempted to scale Java applications to multiple processing systems, difficulties in maintaining object and primitive states across the systems become more numerous.

Traditionally, application developers themselves have been required to account for scaling using common forms of inter-server communication in order to share objects amongst distributed JVMs. One form of communication is Remote Method Invocation (RMI), which is a set of protocols that enables Java objects to communicate remotely with other Java objects. Another form of communication is the Java Message Service (JMS), which is an Application Program Interface (API) for accessing enterprise messaging systems. JMS supports both message queuing and publish-subscribe styles of messaging. Java Temporary Caching (JCache) is a distributed caching system for server-side Java applications.

While each of these techniques allow the developer the flexibility to add scaling to their application, the conventional techniques require application code to be modified, resulting in significant added complexity and development costs. Further, the conventional techniques limit scalability of the application tier, are often quite slow, and tend to abuse database infrastructure for transient needs. Finally, the task of maintaining object identity is a challenge as multiple copies of the same object can be created at the different application servers.

An improved technology is needed for maintaining consistent data across virtual machines.

SUMMARY

The technology herein, roughly described, provides a technique for sharing data among multiple virtual machines in a cluster of virtual machines.

Data sharing functionality is provided to application software which was designed for use on a single virtual machine. Various features which are provided include sharing of object state between virtual machines, flexible locking which is configurable at run-time, distributed method invocation and distributed signaling. In one approach, a data sharing agent or library on a virtual machine instruments the application code to provide the data sharing functionality. The data sharing agents include a lock manager, a transaction manager, an object manager, and a communication manager. A central manager, which may be provided on another server, interacts with virtual machine servers in a cluster to facilitate sharing so that object state is maintained consistently on all virtual machines. The central manager includes an object manager, a lock manager, transaction manager, communication manager, and a persistence manager.

In one aspect, the technology provides a clustering server which provides data sharing among virtual machines in a cluster. A virtual machine identifies "managed" objects of an instance of an application running at the virtual machine. The managed objects are objects for which state information is to be replicated at the other virtual machines in the cluster on which other instances of the application are running. Operations performed by an instance of one application which affect the state of managed objects are detected and distributed. These operations may include for example method calls and field set operations. The virtual machine then communicates information to the central manager for use in replicating the state information at the other virtual machines. For example, a managed object may be identified by an object graph which includes the managed object as a root object. All objects which can be reached by reference from the root object also become part of the object graph and are thereby also managed. In this case, the state information of the virtual machine can be replicated at the other virtual machine by updating object graphs at the other virtual machines so they are replicas of the object graph of the virtual machine on which object state has changed. In this way, object state is maintained consistently among all of the virtual machines.

In one aspect, the invention includes a computer-implemented method for maintaining consistent object states at different virtual machines. The method includes receiving managed object state information from a first virtual machine including a first instance of an application; creating a representation of each of the managed objects; and responsive to the received information, communicating state information to at least a second virtual machine on which a second instance of the application is running to replicate the state information at the second virtual machine.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 1C illustrates a system in which a central manager facilitates data sharing among a group or cluster of virtual machines.

DETAILED DESCRIPTION

The technology described herein includes a set of integrated components that provides a common virtual machine capability for application programs running on distributed systems each having its own local virtual machine. The components discussed herein allow transient data—data actually stored in memory in a virtual machine as part of in-memory object state—to be shared across various virtual machines. In a unique aspect, object state is shared through a series of shared operations, either logical or physical operations, which are detected and distributed as a series of transactions in order to replicate the current state of objects at any of the virtual machines throughout a cluster.

The technology will be described with respect to its application in conjunction with Java applications and Java Virtual Machines. However, it should be recognized that the inventive concepts have broader applicability to other virtual machine and development environments. Moreover, the managed objects utilized on various virtual machines need not be shared by the same application. Finally, as explained herein, respective virtual machines need not operate concurrently.

Figure 1A:
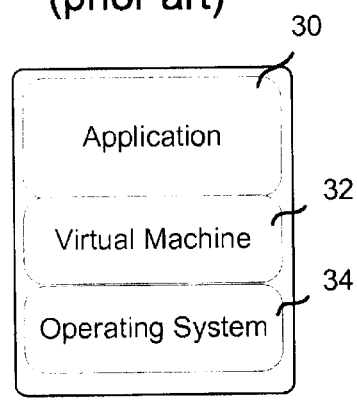
FIG. 1A illustrates a conventional Java application environment.
Figure 1B:
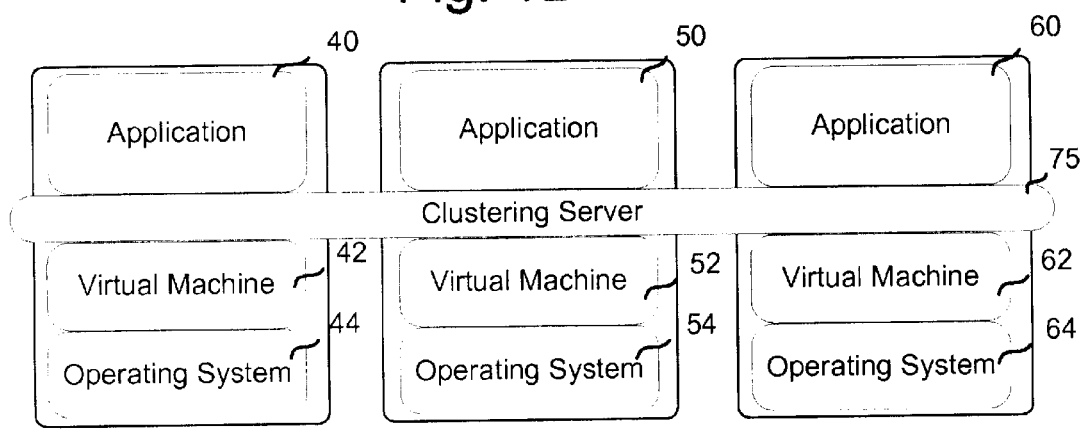
FIG. 1B illustrates a logical depiction of a clustering server technology discussed herein.

FIG. 1B is a block diagram depicting a logical representation of the technology discussed herein. FIG. 1B illustrates three processing systems each including an application 40, 50, 60 operating on a local virtual machine 42, 52, 62. The technology discussed herein provides a clustering server 75 which extends the capabilities of each virtual machine to all other processing devices in a given cluster. This includes sharing data amongst each of the virtual machines in a cluster on objects identified by a cluster administrator via a management interface. In this manner, the data sharing functionality can be easily added to application software which was designed for use on a single virtual machine.

This allows various features to be provided by the technology, include sharing of object state between virtual machines, flexible locking which is configurable at run-time, distributed method invocation and distributed wait-and-notify. Benefits include distribution of data among the virtual machines without the need to maintain state in a database, transparent recovery from application instance failures, clustering as an API-free infrastructure service, reduced development, testing, and maintenance costs, faster application development and scale-out, and fine-grained operations performance visibility and control. With the data sharing functionality provided, there is no API for the application developer to learn, apply, test, and maintain since the data sharing agents/libraries provide this transparency. Lower system life-cycle costs are another benefit, since organizations using the system need not spend time writing code in order to provide clustering capabilities. The system accomplishes this as an infrastructure software component that provides clustering as a service based on user-defined configuration settings which can be changed at production-time. This allows an application to adapt its reliability, availability and scalability characteristics to changing user demands without the need for new development.

In many cases, the data sharing functionality enhances performance. For instance, in one approach, when a shared object is updated, only the field-level changes are sent to the different virtual machines, and only those virtual machines with that object currently in memory are supplied with the update in real time. In another approach, the logical operations necessary to create a current object state are shared between virtual machines. These techniques significantly reduce the amount of data movement, and improve all-around performance of a fully clustered application. Moreover, the data sharing functionality provides this inter-virtual machine communication capability in a scalable manner that cannot be matched by peer-to-peer products.

FIG. 1C illustrates an exemplary implementation of the technology in a clustered system. In this implementation, a central manager 140 facilitates data sharing among a group or cluster of application servers 100. A group or cluster, shown generally at 100, includes a number of servers. This represents one embodiment of how applications are scaled to allow multiple servers to run respective instances of an application (111, 121, 131) for load balancing or to provide increased reliability, availability and scalability. In the present example, three servers are provided, namely server "A" 110, server "B" 120 and server "C" 130. The servers can be co-located or geographically distributed, and interconnected by any type of network, such as a LAN or WAN, or communication link (not illustrated).

As used herein each server or processing system includes, for example, one or more processors capable of executing instructions provided on readable media to perform the methods and tasks described herein. The processing system may include a volatile memory, a mass storage device or other non-volatile memory, a portable storage device, one or more communications or network interfaces and various I/O devices. The above described processing system hardware architecture is just one suitable example of a processing system suitable for implementing the present technology.

The servers 110, 120 and 130 each include a separate instance of an application, for example, application instance "A" 111, application instance "B" 121 and application instance "C" 131. Further, each server includes a virtual machine on which the application code executes, namely virtual machine "A" 112, virtual machine "B" 122 and virtual machine "C" 132. For example, each virtual machine may be a Java Virtual Machine (JVM) which executes byte code of an application. In one embodiment, the applications are the same application with different instances; in another embodiment, the applications call the same instances of the same classes of objects in their respective application code.

Each instance of the application runs locally on each application server and interacts with each virtual machine locally. Objects used by the application are created and maintained by the respective virtual machines on each server. In accordance with the invention, the application code for each of the applications need not provide for the clustering operations described herein. In essence, the application is prepared to run on a single virtual machine and extended to the cluster by the technology discussed herein. In this regard, a series of managed objects, which include a local instance of application object on each server, are identified and clustered by the technology.

A data sharing agent/library 113, 123 and 133 is provided on each respective server to provide functionality for sharing managed objects among the servers, as described in greater detail below. Files stored at the data sharing agent/library are loaded into the associated virtual machine upon start up to modify the application code when compiled into bytecode to provide the data sharing functionality. In particular, the data sharing agents 113, 123 and 133 are responsible for performing bytecode manipulation to implement clustered object management in each local virtual machine 112, 122 and 132. Each may include a lock manager that deals with gaining access to objects under locks, a transaction manager that creates a transaction log as described below, and an object manager. A communication manager may also be provided to enables the virtual machines to communicate with the central manager. The communication manager may include IP address and port information of the central manager.

Each server 110, 120, 130 may also include a conventional operating system and memory for storage of data, such as data used by threads of the application instances.

A central manager 140 is provided to facilitate data sharing among the virtual machines and, in particular, between the virtual machines on which the application instances run. The central manager 140 in conjunction with the data sharing agent/library 113, 123 and 133, acts as a "clustering server" for the applications 111, 121, 131. In essence, each application 111, 121, 131 sees one virtual machine, but with each application instance seeing changes to objects made by other application instances in the cluster. The central manager 140 includes a data sharing application 141 running in an operating system on the manager. The manager may be a separate physical server or may operate on a server with one of the virtual machines. The central manager 140 has the ability to communicate with each of the servers 110, 120 and 130 to share object state information.

The data sharing application 141 works in concert with the data sharing agent/libraries 113, 123 and 133 to distribute shared objects amongst the cluster systems 110, 120, 130. The data sharing application 141 can include a lock manager, transaction manager, communication manager, and a persistence manager. The persistence manager is able to persist object state information to a CM object representation store. The lock manager manages access to distributed locks between the various virtual machines. The transaction manager deals with moving data between members of the cluster in coherent terms. The object manager deals with keeping track of which virtual machines have what objects and what version of the object. A communication manager which enables the central manager to communicate with the virtual machines.

The object representation store 144 includes a record of the managed object states in accordance with the methods discussed herein. Because of the persistence of managed objects by the representation, each of the servers 110, 120, 130 need not operate concurrently.

Advantageously, the central manager 140 and data sharing agent/libraries are implemented by a set of infrastructure software (which may be commonly distributed) that can be installed on suitable processing system hardware.

Subsequent to the installation of agents 113, 123 and 133, virtual machines 112, 122 and 132 are essentially clients of the central manager. As such, virtual machines may be referred to herein as clients. It should be understood that FIG. 1C illustrates only one possible implementation of the technology. For example, in FIG. 1C, the central manager 140 can be provided on a server that is separate from the servers hosting the applications or database software, or may be provided on one or more of the virtual machines. Although only one central manager is used in the present example, multiple managers on multiple servers can be clustered together to make a highly-available hub shared by many virtual machines, even across dispersed geographies. It is also possible to run multiple instances of an application at multiple virtual machines on one server.

A management console 150 provides a graphical user interface which allows an operator to configure and monitor the central manager 140. Optionally, the operator may define configuration files which are provided to the data sharing agent/library to specify which objects should be shared. This configuration data allows various managed objects to be included as managed objects or excluded as managed objects on each of the virtual machines in a cluster. In essence, this provides a form of drop-in/drop-out functionality for the managed objects. The management console can also be used to monitor: a) a current count of unique managed object instances for each client, on a per-class basis; b) a creation rate of managed objects, where both global and per-client counts are provided; c) a rate at which objects are flushed from the clients to the central manager, on a per client basis; d) a rate at which objects are requested from the central manager by a client, on a per client basis; e) a rate at which objects are written to a persistent object store by the central manager; f) a rate at which objects are requested from the persistent object store by the central manager; g) a view of all currently managed roots and fields; h) a list of locks with one or more pending lock or upgrade requests; i) a list of application process threads currently waiting due to contended locks; j) an on-demand display of locks which are currently part of process deadlocks; k) elapsed processing time and number of objects collected by the central manager garbage collection process; and l) a rate at which transactions are committed to the central manager, whether both global and per-client counts are provided.

Figure 2:
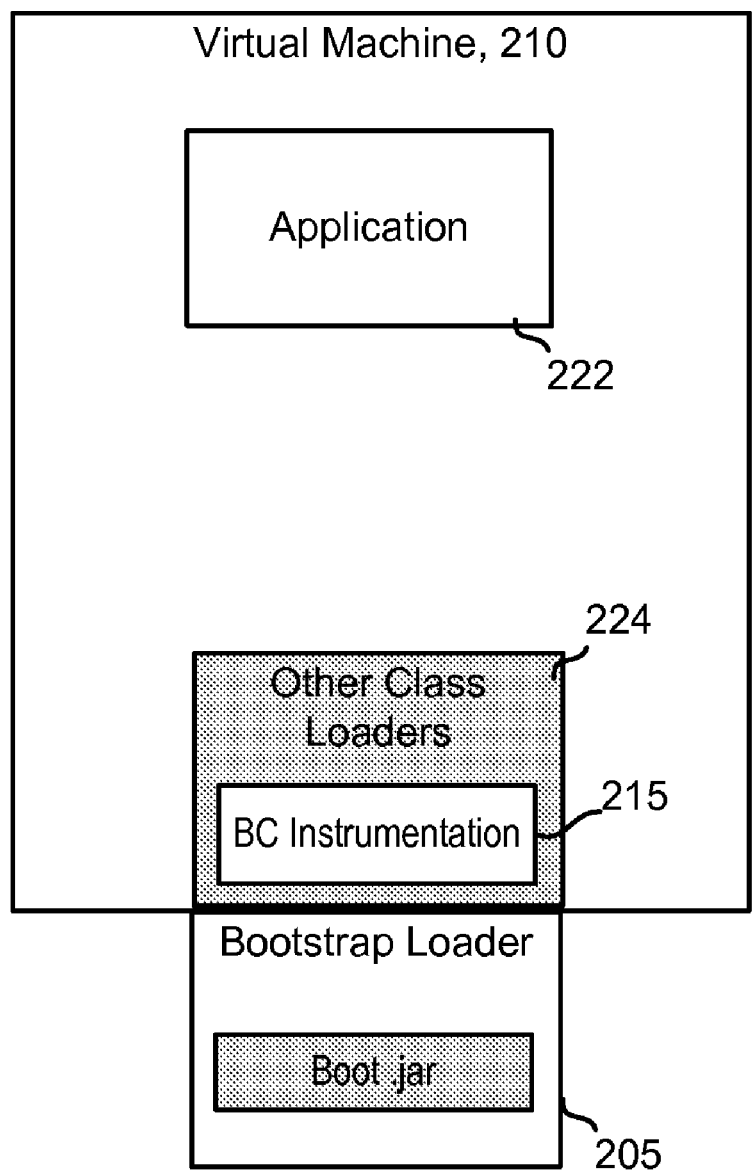
FIG. 2 illustrates various layers of control within a virtual machine.

FIG. 2 illustrates an application running within a virtual machine 210, and various mechanisms by which the data sharing agent/libraries interact with an application on a given virtual machine. A virtual machine 210 generally includes a number of class loaders 224. A bootstrap class loader 205 is provided by some implementations of virtual machines. In a Java Virtual Machine, each and every class is loaded by some instance of a class loader. Whenever a new JVM is started, the bootstrap class loader is responsible for loading key Java classes into memory first. The runtime classes are packaged inside of a runtime .jar file. Normally, developers do not have access to details of the bootstrap class loader, since this is a native implementation. For the same reason, the behavior of the bootstrap class loader will also differ across JVMs. Other class loaders 224 may also be provided. These include, for example, the Java extension class loader, and the application class loader, responsible for loading all of the classes kept in the path corresponding to the java.class.path system property.

In one approach, application code at the server (110, 120, 130) is instrumented using files stored by the data sharing agent/libraries when the application code is loaded into the virtual machine. Where a bootstrap loader 205 is utilized, a custom "boot.jar" file may be used to replace the class definitions in the system dependent runtime .jar file. Where the virtual machine technology 210 does not implement a bootstrap class loader 205, this technique is not required. Other class loaders 224 are instrumented to allow the data sharing agent/library files to introduce the data sharing functionality into the application classes. Class loaders enable the virtual machine 210 on any respective server to load classes without knowing anything about the underlying file system semantics. Similarly, the class loader 224 allows the application 222 to dynamically load classes. The data sharing agent/libraries can inspect and, if activated, intercept API calls made by the application 222. The scope of interception can be at a byte code level, in which case field updates, method calls, synchronization calls, and wait/notify calls, for instance, are visible and controllable at runtime. When alternative facilities, for example HotSwap or JVMTI, are provided by the virtual machine, the data sharing agent/libraries can introduce the data sharing functionality to application classes through these mechanisms. This technique allows the data sharing agent/libraries to delay and optimize the introduced data sharing functionality.

Note that the application source code remains unchanged, and in one implementation, no stored byte code is changed such that were one to decide not to run the clustering server, one can restart the application without enabling the byte code manipulation. As discussed more fully below, during this process, object classes specified as shared are identified and instrumentation added to allow server locking and logical change tracking.

Due to the instrumentation of bytecode at the virtual machine level, another aspect of "drop-in/drop-out" capability is provided. That is, the data sharing functionality which is provided by the instrumentation can be easily activated or deactivated by a system operator at application runtime. This drop-in/drop-out capability further allows the data sharing functionality to be provided for existing applications without modifying the application code to conform to an API, or providing any such API. The developer can write an application for a single virtual machine and configure the application to be transparently shared across multiple virtual machines. All that is required is the installation of the data sharing agent/libraries and the proper configuration of opt-in parameters via the management console. The drop-in/drop-out capability also allows rapid assessment of the degree to which the data sharing functionality can benefit a given application, what-if analysis of various opt-in sets, and the ability to switch the data sharing functionality on and off at runtime. The drop-in/drop-out capability also eliminates the need to use custom-developed or vendor framework clustering and memory sharing in new applications since these needs can be handled with no need for explicit code.

This data sharing functionality may alternatively be implemented in the bytecode interpreter natively. That is, while developers normally do not have access to the bytecode interpreter, virtual machine providers who do have access to the bytecode interpreter may build the same functionality provided by instrumentation of the bytecode at the classloader level directly into the virtual machine instead.

Figure 3A:
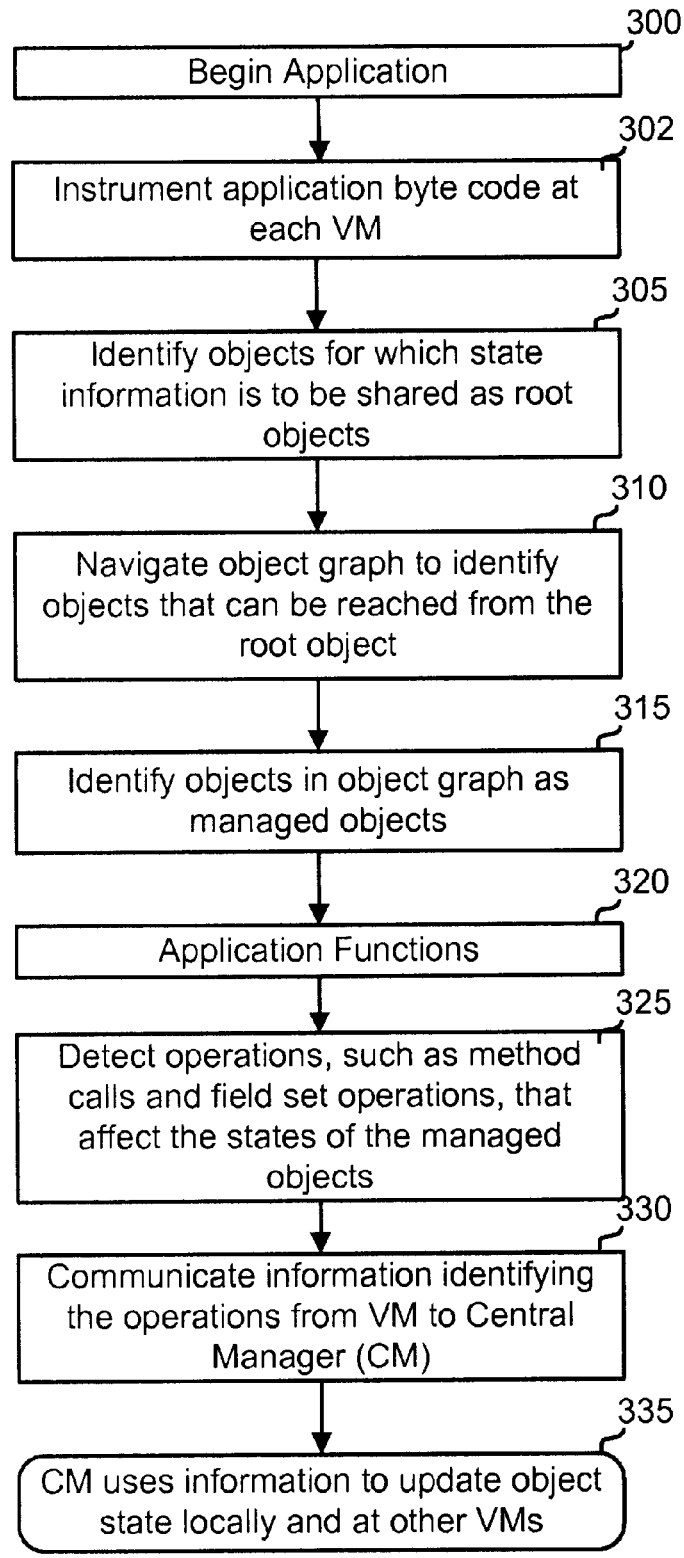
FIG. 3A illustrates a method for identifying and sharing managed objects among virtual machines.

FIG. 3A illustrates a general method for identifying and sharing managed objects among virtual machines. At block 300, an application begins its execution and at step 302 the application byte code is instrumented prior to execution of any functions on objects, as described above. At block 305, the instrumentation identifies objects of the application for which state information is to be shared. In particular, these objects are identified as root objects of an object graph (see also FIG. 4). These objects are identified based on an operator defined configuration identifying which objects should be managed objects in the cluster.

In this step, the byte code instrumentation adds functionality to each managed class transparently. Exemplary pseudocode representations of this functionality include a function lockmanager.getlock( ), a transactionmanager.starttransaction( ) and a transactionmanager.commitTransaction( ) and lockmanager.releaseLock( ). As will be explained below, the getlock and releaseLock functions request, respectively, a lock from the central manager for the cluster-wide managed object via the lock manager process, and a lock release on the managed object from the central manager. The transactionmanager.starttransaction and transactionmanager.commitTransaction functions are used to generate transactions which communicate changes to the central manager. These functions surround the application code, as described below.

At block 310, an object graph of each of the identified root objects is navigated to identify the objects that can be reached from the root object. For example, an object is reachable by the root object if there is a field assignment of an object reference into one of the root's field values at runtime. At block 315, the objects in the object graph are identified as managed objects, such as by flagging the objects. Thus, the root object and the objects reachable from the root object become managed objects. Optionally, the operator can use the management console to selectively exclude objects which are reachable from a root object from being managed by declaring a field to be transient.

In one aspect, the manager allows specification of root objects to manage all objects accessible by the root. An object is reachable by the root object if it is part of the object's reference graph, such as, for example, where there is a field assignment of an object reference into one of the root's field values at runtime.

Figure 4:
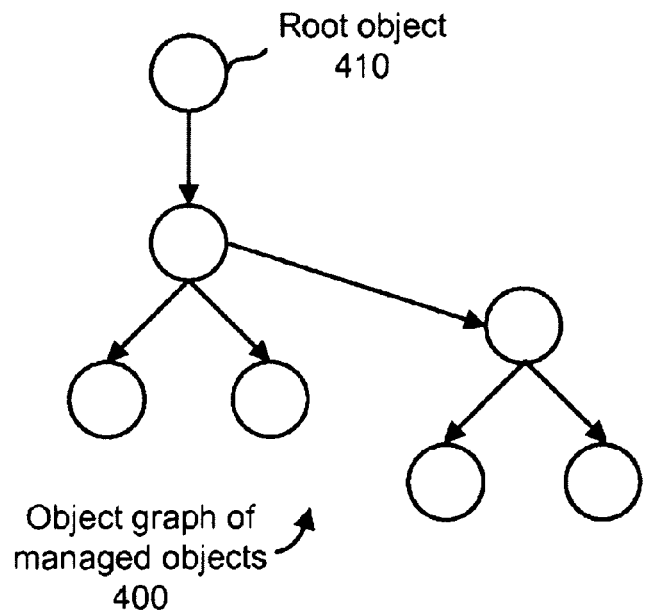
FIG. 4 illustrates a representation of an object graph of managed objects.

FIG. 4 illustrates a representation of an object graph of managed objects. The object graph 400 includes a root object and a number of objects, shown as circles, which are reachable from the root object, as indicated by the connecting arrows. An object pointed to by another object is reachable from that object. A specific illustration is provided below in connection with FIG. 5.

An object graph includes a root object and objects that are reachable from the root object. A root object can be a long-lived object, such as a cache implemented using native Java collections, a servlet session, or a hash map, an example of which is provided by the Java class HashMap. For example, the operator can configure managed objects using a configuration file in a known format, such as XML, or alternatively use the management console to identify the managed objects. Moreover, note that not all objects in an application need be managed. Only a subset of all objects used by an application need to be identified as managed. A managed object is a distributed object whose state is maintained consistently at the different virtual machines in a cluster of virtual machines. Generally, it is desirable to manage objects that represent pure state information, while avoiding replicating objects that refer to operating system resources. For example, business objects such as customer records might make good managed objects.

For example, an XML configuration file at the data sharing agents/libraries may modify values of a "<root>" element. The operator specifies the fully qualified field, and a name to associate with the field. To illustrate, the following configuration sets up two objects for sharing—"exampleField1" and "exampleField2", which are members of the "ExampleClass1" and "MyClass2" classes, respectively:

```
<roots>
    <root>
        <field-name>ExampleClass1.exampleField1</field-name>
        <root-name>exampleRoot1</root-name>
    </root>
    <root>
        <field-name>MyClass2.exampleField2</field-name>
        <root-name>exampleRoot2</root-name>
    </root>
</roots>
```

Alternatively, roots can be given a common "name" even though they may be two differing fully qualified field names. In this case, the two or more root fields that share the common name will refer to the same object instance. Hence, one can, in two different classes, bind the same root to different variables. In terms of the example, even though there are two different fields in different classes, even though they are different fields, if they share a common name, they will be the same set of objects.

The object manager in the client can dynamically prune in-memory versions of a managed object graph so that only portions of the managed graph need be stored in the client virtual machine's memory at a time. This allows arbitrarily large shared object graphs to be fit into a constrained memory footprint in the client virtual machines. Pruned segments of the object graph can be faulted in from the server dynamically as needed as code on a virtual machine traverses the managed graph and follows a reference to an object that has been pruned. This process happens automatically and transparently to the user code. As this happens, the permanent representation of the managed object graph is unaltered in the central manager.

Returning to FIG. 3A, at block 320, the instrumented application begins running and, at block 325, the instrumentation detects operations, such as method calls and field set operations, at a given virtual machine on which the instrumented application is running, that affect the states of the managed objects. The process of detection at step 325 is further detailed with respect to FIGS. 3B and 3C.

At block 330, information identifying the operations, such as the method calls and field set operations, and the central manager level (or global) unique identifier of the object or objects involved, is communicated from the virtual machine to the central manager and, at block 335, the central manager uses the information to update a representation of the managed objects' states locally and at other virtual machines.

The central manager may assign global identifiers to the managed objects so that it can recognize any managed object in the cluster. Conventionally, only locally specific, non-deterministic identifiers are assigned to objects by the virtual machines. In accordance with the technology herein, when a new managed object is created on a local virtual machine, a global unique identifier is assigned to the object by the virtual machine on which the object is created. A group of central manager level unique identifiers is provided by the central manager to each virtual machine.

Updates to the fields of a managed object are tracked at a fine grained level of granularity and pushed to other virtual machines via the central manager. By joining a root graph, an object is flagged as managed and its state is kept up-to-date across a cluster of servers.

Figures 3B, 3C:
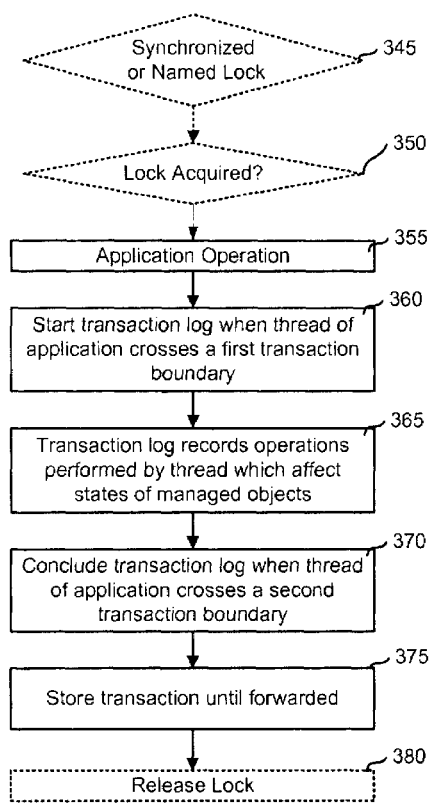
FIG. 3B illustrates a method for defining transactions within the context of the technology
FIG. 3C illustrates transaction boundaries within a code segment.

FIG. 3B illustrates a method for sharing the transaction data involving object data among virtual machines. At block 345, optionally, a determination is first made as to whether a given method is synchronized or a named lock is identified for the method, and at step 350, whether the lock has been acquired. Acquiring a lock is optional depending on how an operator chooses to configure it. Transactions can be created under concurrent locks in which case no locks are acquired. This may be used in the case where potential write-write conflicts are tolerable. At step 355, the application begins operation on the locked code. At block 360, a transaction log starts recording operations which are performed by the thread which affect the states of managed objects at a first boundary in the code. At block 365, the transaction records all operations until block 370, at which point the transaction is concluded when the thread crosses a second transaction boundary. At block 375 the transaction is stored until forwarded to the central manager. At step 380 the lock (if any) is released.

In one case, transactions can be provided on both method and Java synchronization boundaries, where a transaction is a set of changes to managed objects made between defined transaction boundaries. Transactions are associated with, and protected by, zero or more locks. Transactions and locks function as a multi-virtual machine extension of standard Java synchronization and the Java memory model. Java synchronization provides exclusive thread access to sections of code on monitor/lock enter, and flushes local changes to main memory on monitor exit. In a cluster, locks provide a user-defined, cluster-wide access policy to sections of code, and local changes are flushed to the central manager at the close of a transaction. In this way, threads in a cluster of multiple virtual machines can interact in the same way that they do in a single virtual machine.

This is illustrated by FIG. 3C where the transaction boundaries need not be the same as the lock boundaries. For a synchronized block of code that is synchchronized on managed object A, a first lock is required and a first transaction boundary (startTransaction(P)) begins after acquisition of the first lock. Where a nested synchronized block of code that is synchronized on managed object B (synchronized(B)) exists, the transaction boundary for the first transaction P is completed and a second transaction started for the nested synchronized block of code. The transaction boundaries in this context are synthesized by the instrumentation of the byte code (or within a suitably enabled virtual machine) to provide transaction boundaries which are granular to the particular functions enumerated in the application code. Each transaction is thus defined (in the Java context) in terms of a thread monitor enter and monitor exit in a code block. For named locks, the transaction is defined in terms of a method boundary.

Figure 5:
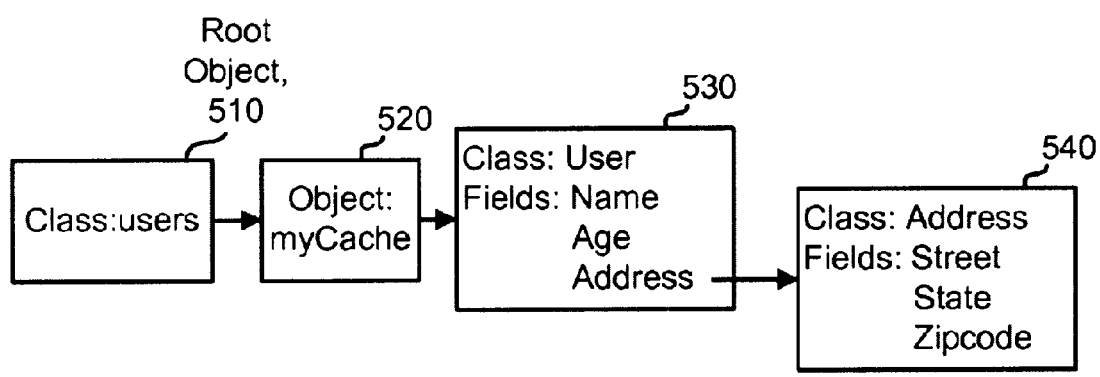
FIG. 5 illustrates an example of managed objects, including classes and fields.

FIG. 5 illustrates an example of managed objects, including classes and fields. The managed objects include a root object 510 "users" and a number of objects which are reachable from the root object, including an object 520 named "myCache", an object 530 named "User", and an object 540 named "Address". The object 530 has the fields "Name", "Age" and "Address". The object 540 named "Address" is reachable from the "Address" field of the object 530, and includes fields "Street", "State" and "Zipcode". The objects provided could be used by a web-based application, for instance, which requires a user to provide his or her name, age and address. Note that there is nothing special about the root object 510 or object 520; any object can be identified as a managed object, (except objects that represent JVM-specific or host machine specific resources, such as network sockets or file descriptors).

In this example, a users object references a map called mycache. Once one establishes a reference that the cache is managed, then the entire sub-graph of an object is managed. That is if mycache is managed, as a root, everything it points to is also managed Note that Java primitives may also be assigned object IDs also. Once a managed object has a reference to an unmanaged object, it makes everything that it references become managed.

Figure 6:
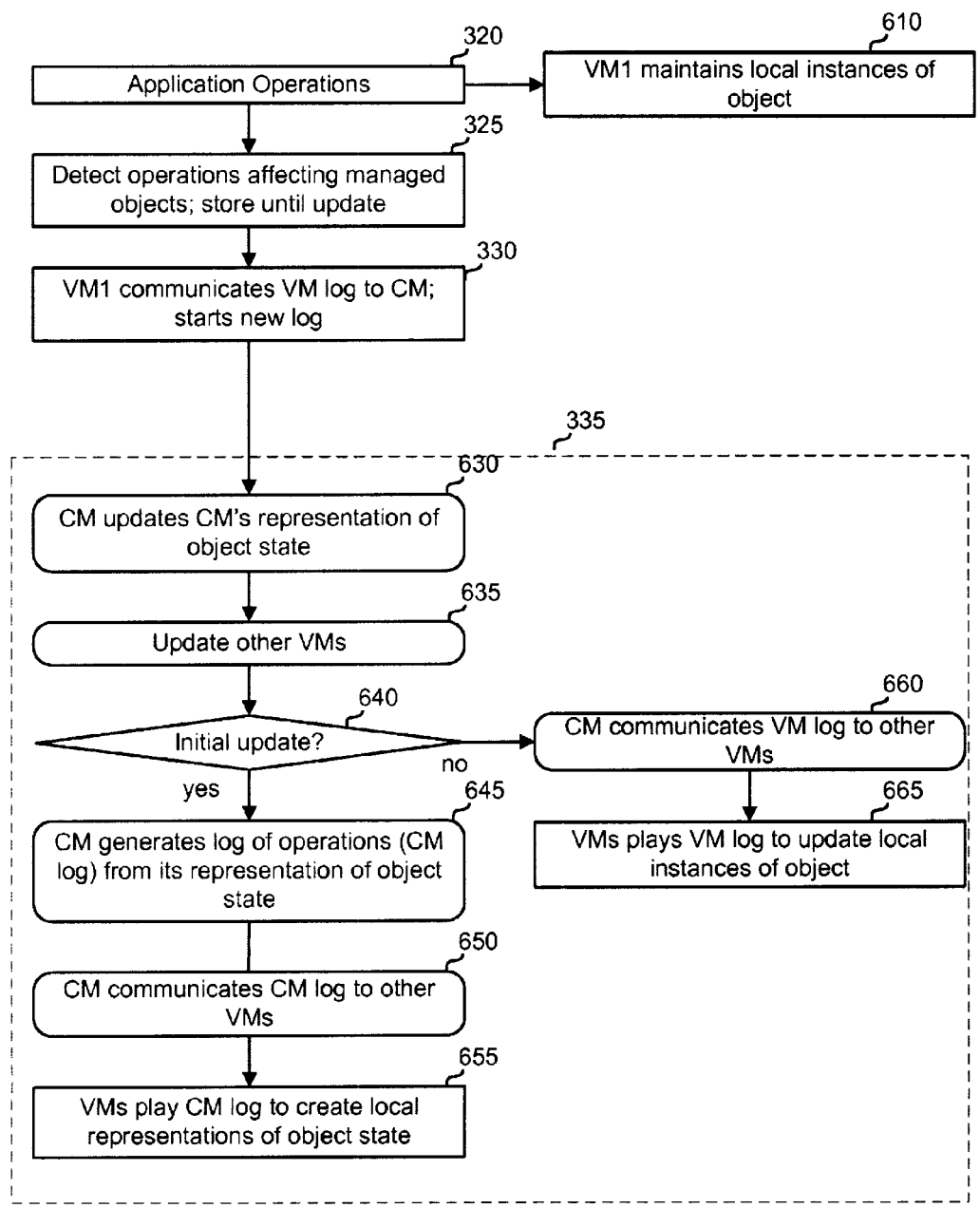
FIG. 6 illustrates a method for distributing object operations and data among virtual machines.

FIG. 6 illustrates a method for sharing object information among virtual machines using operation logs. In a unique aspect of the technology, object data can be shared logically and physically, depending on the operation on the object by an application. By sharing data using operations on any individual local object, each virtual machine maintains a locally specific representation of object state. To do this, the steps which were taken by a virtual machine to get its memory to store object data are detected and logged, and those steps are then performed at another virtual machine. For example, consider that each virtual machine typically assigns a locally generated identifier for each instantiated object. When information associated with the object, such as field level data is stored, the object identifier, as a key, is hashed to determine a location (bucket) in a hash map in which the information will be stored. However, since each virtual machine uses a different local identifier for its local instance of the same object, each virtual machine's hash map will differ even though each hash map represents the same object state. Thus, physically copying the hash map data in one virtual machine's memory, bit by bit, to the memory of another virtual machine, would not successfully copy the underlying object state information. A specific technique for achieving logical sharing overcomes this problem, as follows.

As noted above in FIG. 3A, when application operations occur at step 320 accessing or affecting a managed object, those operations are detected at step 325 and communicated to the central manager at step 330. The virtual machine (in this example VM1) is responsible for updating and maintaining its own local representation of object state at step 610. VM1 maintains a local representation of the states of the objects which are instantiated by the application, including managed and non-managed objects. This is a base function of the virtual machine.

Step 325 is performed by recording, for example, the method calls or field set operations that the application code has performed. Instead of keeping track of the actual object references, the transaction log keeps track of the actions the application has done. Every time a central manager need to create the object in a new VM or to make changes to it, it can replay this log. For each action, such as when a new object is created or a function (such as a put call) is performed, this logical action is recorded and the physical steps written into a transaction. Any new objects and their data is now recorded in the log.

These transactions are stored in one format in the memory in the virtual machine, then transmitted to the central manager (in, for example, a serialized format) in the message in the communications layer and deserialized at the central manager.

At step 330, VM1 updates the central manager. The updating may occur from time to time at various points in the execution of the application code. For example, the updating may occur after the application updates one or more managed objects under a lock, as discussed above. As noted briefly above, the instrumentation added to the application code may include a transactionmanager.committransaction( ) which takes the log built up in the transaction through this whole process, and communicates it to the central manager. The shipping may occur immediately or in a grouped set of transactions, such as in a batch job.

To perform the update, VM1 communicates a log, VMLog, to the central manager. VM1 may delete the log and start a new log when the central manager confirms receipt of the log. Any type of network communication technique may be used. As mentioned, the data sharing agent/library at each virtual machine may include functionality for communicating with the central manager.

At block 630, the central manager processes the transactions stored in the VMLog to update a local representation of the states of the managed objects. Essentially, the operations such as method calls, with associated field values, which were performed at VM1, are stored in a data structure on the central manager.

A description of each object is provided on the central manager. This description includes meta data defining the object's class, its fields and the field values. For a physical object, for example a class "myclass" with four fields, the server description includes the server class and IDs for each field. For example, a physical object includes the name of the class, the name of the class loader, fieldname, field value pairs for literal fields, field name and referenced object ID pairs for reference fields, object version, and possibly other information. For logically managed objects, one needs to know what to do with changes which may have occurred. A description of a logically managed object in includes, for example, where the logically managed object is a map, the contents of which may be a set of keys, collection of values, or set of key-value mappings. The order of a map is defined as the order in which the iterators on the map's collection views return their elements. For this example of a logically managed object, a representation of the map is kept on the central manager. The representation relates the object ID or literal keys to the corresponding object ID or literal values. In addition, a logical action (such as a put) is assigned a function ID which is interpreted by the central manager allowing the central manager to create the appropriate mapping of keys to values. In the case of other logically-managed classes, such as a list, examples of logical actions are add and remove; for a map, actions includes puts and gets; any number of logically managed actions may be stored in this manner. The central manager's representation is not another instance of each managed object, but merely a representation of that object.

Each logical action performed on a logically managed object is identified and the data associated with the logical action provided to the central manager to update its representation. These logical actions are passed to any other virtual machine in the cluster that currently has said logically-managed object in its memory so they may be replayed against its local instance of said managed object.

At block 635, the central manager updates the other virtual machines in the cluster so that the state of the managed objects at VM1 is replicated at the other virtual machines. As noted above, depending on whether the update is of a physically managed object or a logically managed object, the transaction may have a slightly different format. In addition, there are two different scenarios for an update depending on whether or not the update to the other virtual machines is an initial update (decision block 640).

An initial update occurs when the central manager first updates a virtual machine, in which case it is necessary to convey the current state of the managed objects to the virtual machine. This may occur after application startup or after a new virtual machine joins the cluster. In one approach, the central manager can store each of the logs received from VM1 (or any of a number of VMs) and provide them to the other virtual machines to be played. However, this approach is inefficient as many operations may change the same managed objects repeatedly. Since only the most current state of a managed object is relevant, and not the previous states it traversed to reach the current state, it is more efficient for the central manager to generate a log of operations (central manager log) from its representation of object state (block 645). This approach is more efficient since only the operations which are necessary to reach the current object state are generated. At block 650, the central manager communicates the central manager log to the other virtual machines and, at block 655, the virtual machines play the central manager log to update their local representations of object state. The operations in the central manager log, such as method calls and field set operations with associated values, are performed at the other virtual machines so that the state of the managed objects at the central manager, and at VM1, is replicated at the other virtual machines. An object graph at the other virtual machines is thereby updated so that it is a replica of the object graph at the central manager and at VM1.

If an initial update of a virtual machine has already been performed, then the subsequent updates can be incremental updates. In this case, the central manager conveys the virtual machine log from VM1 to the other virtual machines (block 660), and the other virtual machines play the virtual machine log to update their local representations of object state (block 665). Again, the object graphs at the other virtual machines are thereby updated so that they are a replica of the object graph at the central manager and at VM1. The updating of the other virtual machines by the central manager may occur from time to time. For example, the central manager may update the other virtual machines when it receives an update from VM1.

Note that the process shown in FIG. 6 is performed at each of the virtual machines in a given cluster, independent of the processes on other servers. Thus, the central manager receives logs from the different virtual machines and communicates the virtual machine logs, or logs generated by the central manager, to the appropriate virtual machines to maintain a consistent representation of the states of the managed objects across all of the virtual machines. Furthermore, by maintaining current state information locally, the central manager can update new virtual machines which are added to a cluster, and virtual machines which come back online after being taken offline, such as for maintenance.

Initial and incremental updates are illustrated further, as follows, in FIG. 7 and FIG. 8, respectively.

Figure 7:
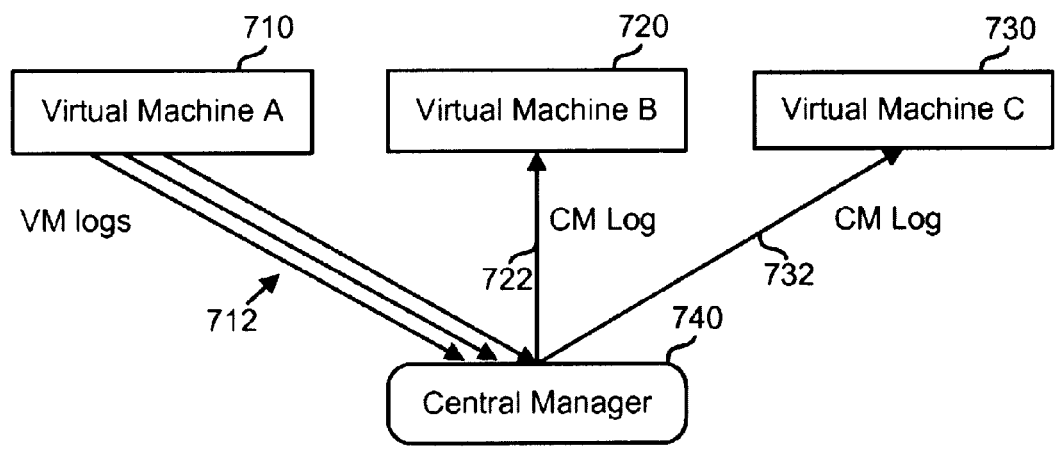
FIG. 7 illustrates the sharing of object data from a first virtual machine, in an initial update, using operation logs of the first virtual machine, and an operation log of a central manager.

FIG. 7 illustrates the sharing of object data from a first virtual machine, in an initial update, using operation logs of the first virtual machine, and an operation log of a central manager. Here, a virtual machine "A" 710 sends a number of virtual machine logs to the central manager 740 over time, as indicated by paths 712. When an initial update of one or more of the other virtual machines is needed, the central manager generates its own log of operations, central manager log, and sends it to the other virtual machines, such as virtual machine "B" 720 and virtual machine "C" 730 via paths 722 and 732, respectively. Thus, one central manager log can represent the changes to object state which result from multiple virtual machine logs.

Figure 8:
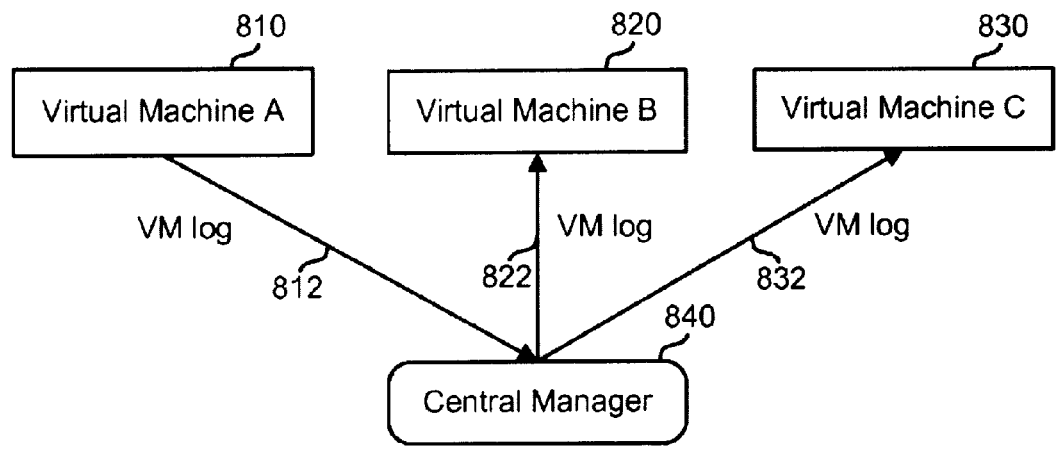
FIG. 8 illustrates the sharing of object data from a first virtual machine, in an incremental update, using an operation log of the first virtual machine.

FIG. 8 illustrates the sharing of object data from a first virtual machine, in an incremental update, using an operation log of the first virtual machine. Here, a virtual machine log sent from virtual machine "A" 810 to the central manager 840 via path 812 is relayed to the other virtual machines, namely virtual machine 820 and virtual machine 830, via paths 822 and 832, respectively. That is, the central manager provides a communication to virtual machine 820 and virtual machine 830 which includes the information from the virtual machine log provided by virtual machine 810. In an alternative, peer-to-peer embodiment of the technology, the virtual machine log from virtual machine 810 could be sent directly by virtual machine 810 to the other virtual machines 820 and 830 rather than being relayed by the central manager.

Figure 9:
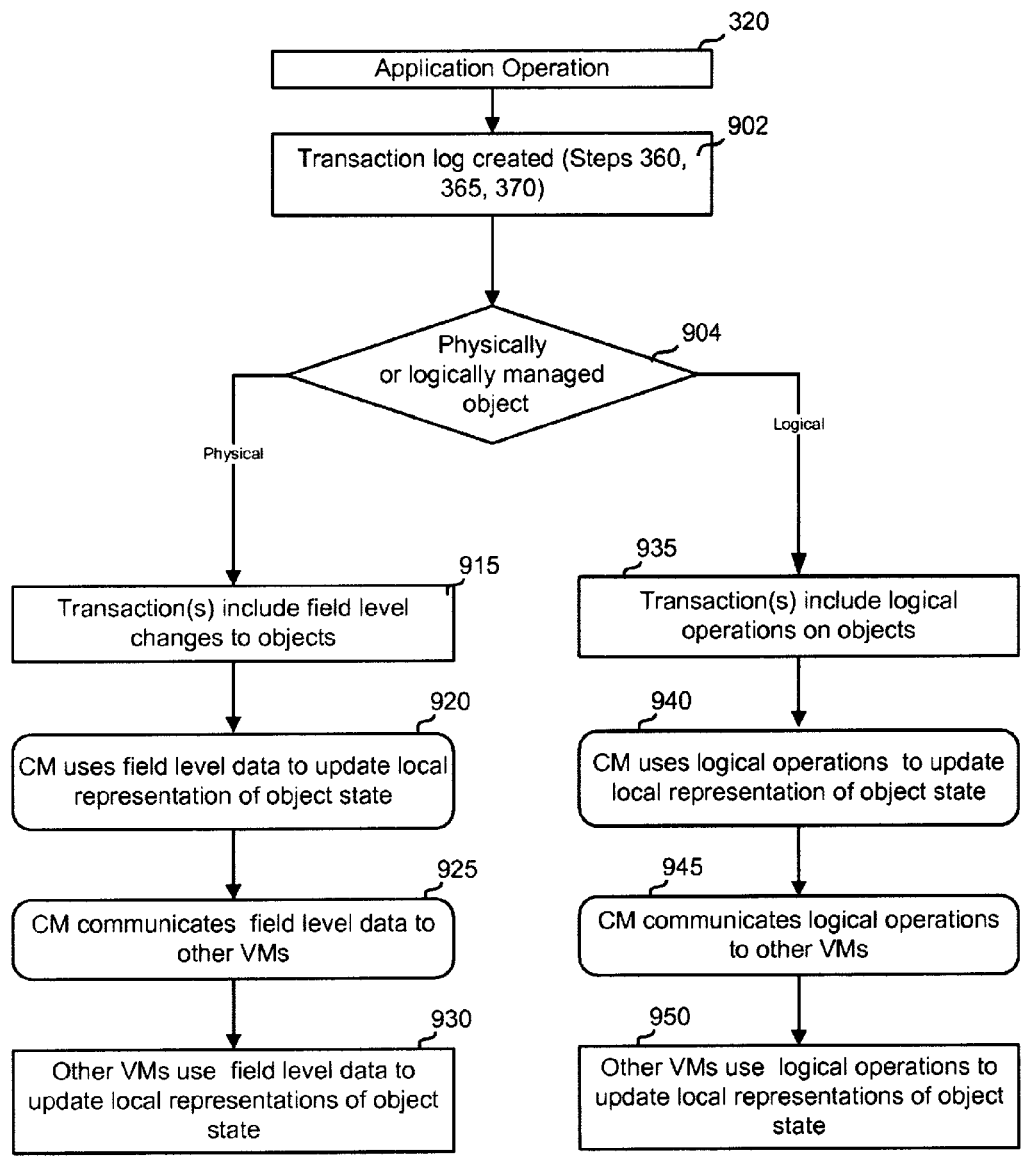
FIG. 9 illustrates a method for sharing of logical operations including field level object data and logical collections among virtual machines.

FIG. 9 illustrates a method for sharing of field level object data and logical operations among virtual machines. As noted above, field level sharing of object data as well as sharing logical operations are unique aspects of the technology.

By sharing object data at a field level of granularity, it is possible to share changes to object state at a fine grained level. That is, changes to specific fields of managed objects can be shared among virtual machines without sending unnecessary information regarding fields of managed objects which have not changed, or fields of unmanaged objects. This approach minimizes the amount of information which needs to be communicated between the central manager and the virtual machines. For example, referring to the "Address" object 540 in FIG. 5, assume the "Street" field is updated to a value of "123 Main Street". In this case, it would only be necessary to provide updated values, in order for the central manager and the other virtual machines to update their representations of object state. There is no need to share the other fields of "Address", such as "State" and "Zipcode", which did not change. Nor is there a need to share the states of objects from which object 540 can be reached, such as objects 510, 520 and 513, which also did not change. An example process for sharing of field level data among virtual machines follows.

When an operation on a managed object occurs in the application (as in step 320 previously described), transactions are created at step 902 in accordance with the foregoing description of steps 1315, 1320 and 1325. The information transmitted will depend on whether the object is a physically managed object or a logically managed object (step 904). If the object is a physically managed object, at block 915, field level changes to the managed objects are provided in the transaction. That is, the changes are detected at a field level of granularity. This may include, e.g., detecting field level data affected by an application function. At block 920, a central manager uses the field level data to update its local representation of object state. The information provided at step 915 may include for a physical object, the name of the class, the name of the class loader, fieldname and field value pairs for literal fields, field name and referenced object ID pairs for reference fields, object version, and possibly other information, as discussed above.

At block 925, to perform an update of any other VM, the central manager communicates the field level data to the other virtual machines in the cluster and, at block 930, the other virtual machines use field level data to update respective local instances of the managed objects.

Similarly, if the transactions affect logically managed objects, the transactions include logical operations at step 935. At block 940, a central manager uses the method calls and other logical operations to update its local representation of object state. At block 945, to perform an update of any other VM, the central manager communicates the logical operations to the other virtual machines in the cluster and, at block 950, the other virtual machines replay those logical operations against their respective instances of the managed objects to update the state of those managed objects.

Figure 10:
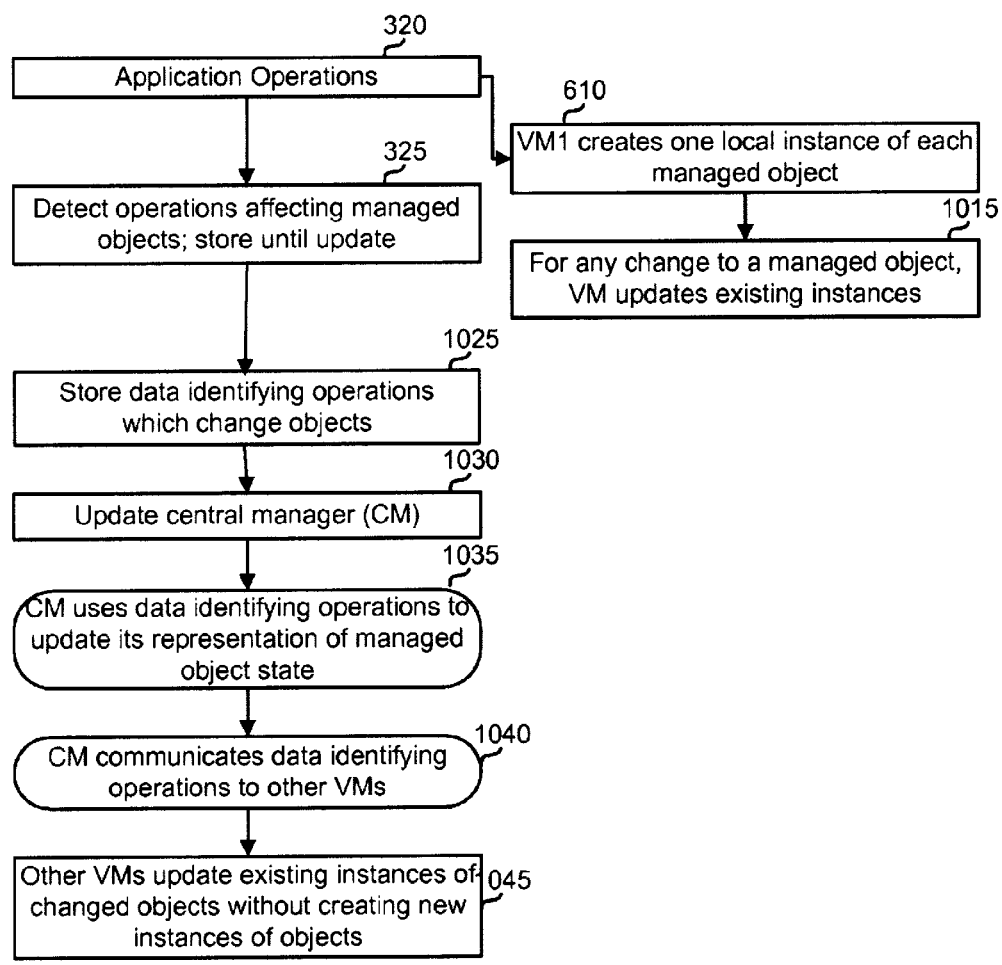
FIG. 10 illustrates a method for sharing object identity among virtual machines.

FIG. 10 illustrates a method for sharing object data among virtual machines while maintaining object identity. In a unique aspect of the technology, where conventionally objects would be distributed by maintaining additional copies of objects in, for example, a clustered Map, the sharing technology maintains the unique identity of managed objects by eliminating the need to copy manage objects themselves.

As noted above, when application operations occur at step 320 accessing or affecting a managed object, those operations are detected at step 325. Each virtual machine (in this example VM1) is responsible for updating and maintaining its own local representation of object state at step 610. VM1 maintains a local representation of the states of the objects which are instantiated by the application, including managed and non-managed objects. The VM updates any change to a local instance of a managed object at step 1015.

Step 325 is performed by recording, for example, the method calls or field set operations that the application code has performed. Instead of keeping track of the actual object references, the transaction log keeps track of the actions the application has done. For each action, at block 1025, data identifying the operations of a changed object is included with the transaction. That is, for each transaction, an object ID is generated at the client and, as noted above, is provided as part of the field data for a physically managed object, as well as the operations data for a logically managed object. Object references are thus maintained in the local representation at the central manger and at any other VM using the CM log to update its local representation of the object. At block 1030, the central manager is updated. To perform the update, VM1 communicates data identifying the object and the logical operations to the central manager. At block 1035, the central manager updates its local representation of managed objects using the object ID and transaction ID data. At block 1040, the central manager communicates data identifying the operations to the other virtual machines and, at block 1045, the other virtual machines update existing instances of the changed objects without creating new instances of the objects. With this approach, object identity is maintained across the virtual machines.

The central manager also provides various cluster wide locking functionality. In one embodiment, both named manual locks (named locks) and automatic locks (auto locks) are provided. Clustered locks can span an arbitrary number of VMs. For automatic locking, the CM globally locks any point where the application code uses, for example, the Java "synchronized" keyword, to provide distributed locking for applications where "synchronized" is already in use or where the application is multi-thread safe. Named locks can be used with help from developers for applications that were never designed to be distributed and multi-threaded. Named locks specify which blocks of code in any application should be locked globally.

Both auto locks and named locks are available in two different modes, clustered locks and greedy locks. With clustered locks, the virtual machine obtains a lock explicitly from the central manager each time a lock is needed.

FIGS. 11A-11D illustrate clustered locking.

At block 320 the application in the course of performing operations will request a lock on a managed object A virtual machine may request a lock when it encounters a block of code which uses the Java key word "synchronized", as mentioned previously. Alternatively, the operator may use the management console to designate a block of code of an application which does not use the keyword "synchronized" as a method which invokes a request for the lock.

In one embodiment, both named manual locks and automatic locks, are implemented. Administrators can use automatic locks, which globally lock any point where the application code uses, for example, the Java "synchronized" keyword, to provide distributed locking for applications where "synchronized" is already in use or where the application is multi-thread safe. Named locks can be used with help from developers for applications that were never designed to be distributed and multi-threaded. With named locks, users can specify which blocks of code in an application should be locked globally.

At block 1115, VM1 sends a request for a lock to the central manager. At block 1120, the central manager accesses its records to determine if the lock on the object is currently available. For example, the central manager may maintain a record listing object identifiers and associated lock status, indicating whether there is a lock on an object and, if there is a lock, which thread in which virtual machine has the lock, and the type of lock, e.g., read, write or concurrent. A read lock allows all instances of the application on the different virtual machines to have concurrent read access but not write access to managed objects within the scope of the given lock. A write lock allows one thread on one virtual machine to have read and write access to managed objects within the scope of the given lock, but prevents any other thread in any other virtual machine from acquiring the given lock. A concurrent lock allows multiple threads on multiple virtual machines to make changes to managed objects at the same time. This lock maintains a stable view within the transaction that the lock protects but allows write-write conflicts between threads in the same or other virtual machines. Concurrent locks should be used when performance is more important then the possibility of write-write conflicts. In the case of a write-write conflict, the last writer wins.

At decision block 1125, if the lock is not available, the central manager waits until the lock becomes available. When the lock is available, the central manager grants the lock to the requesting virtual machine, at block 1135, and updates its records accordingly. If applicable, at block 1140, the central manager blocks any other thread in the same or other virtual machines from taking control of the lock. At block 1145, the virtual machine may perform any operation under the lock locally without CM interaction.

After using the lock, the virtual machine informs the central manager that it is releasing it, at block 1150. At block 1155, the central manager updates its records accordingly, and grants the lock to the next thread in contention for that lock in any connected virtual machine, if any. That is, the lock is granted to any other thread in any virtual machine that is blocked in contention for the lock.

In another alternative, the lock is a "greedy" lock, in which case the virtual machine holds the lock so that threads local to that virtual machine may acquire and release the lock repeatedly (at step 1145) without communicating with the central manager until the central manager commands it to release the lock. With a greedy lock, VM1 holds the lock not only for the duration of one synchronized block, but until the lock is recalled by the central manager, such as if another virtual machine requests the lock from the central manager.

FIGS. 12A-12D illustrate the operation of a greedy lock. Recall with a clustered lock that VM1 releases the lock after a specified duration of work, one and only one block of code protected by that lock. With a greedy lock, VM1 may continue to process as many blocks of code protected by that lock as it needs, in a local lock context, until the lock is recalled by the central manager, such as if another virtual machine requests the lock from the central manager.

Figure 11A:
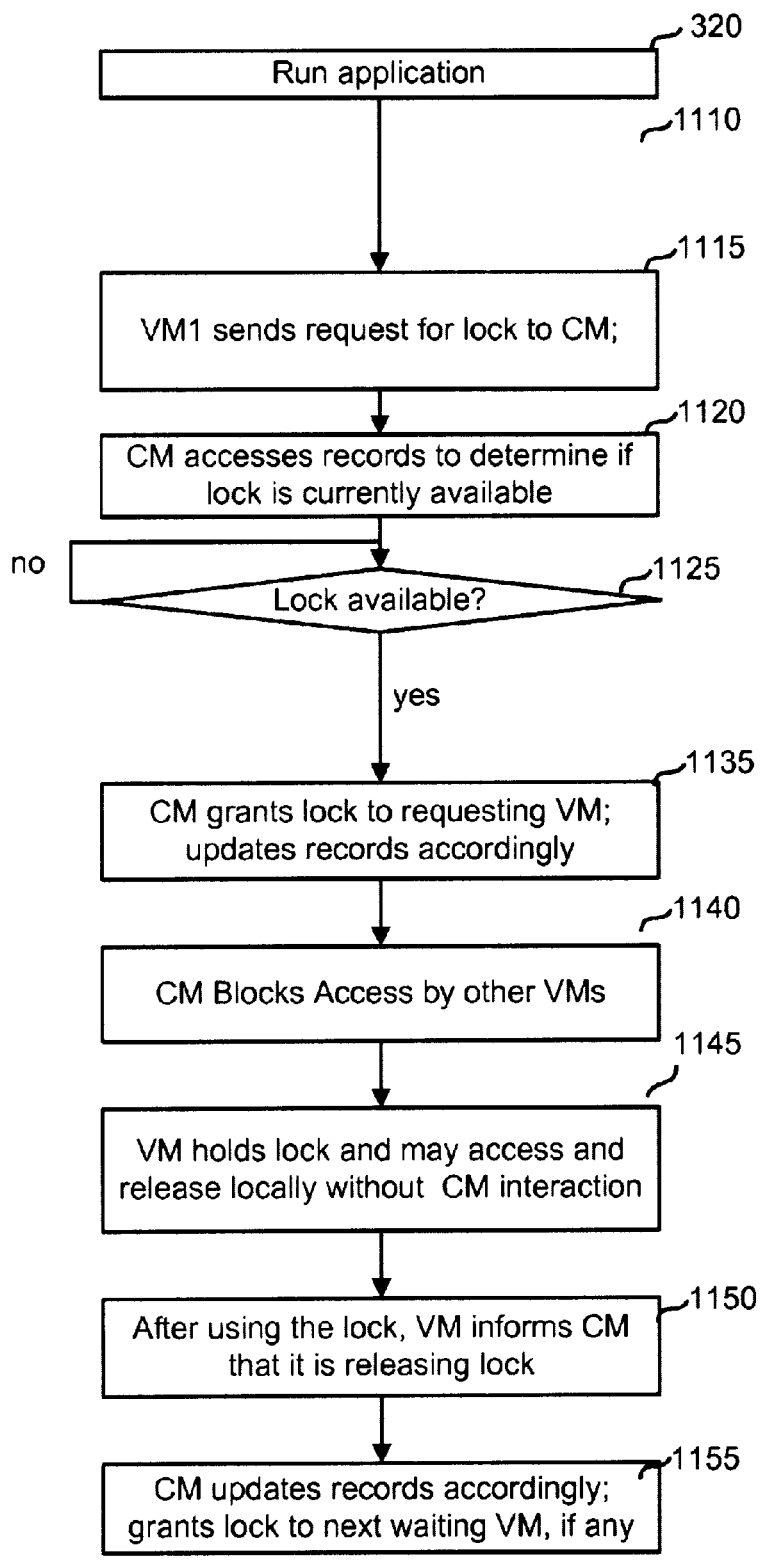
FIG. 11A illustrates a method for providing clustered locking.
Figure 11B:
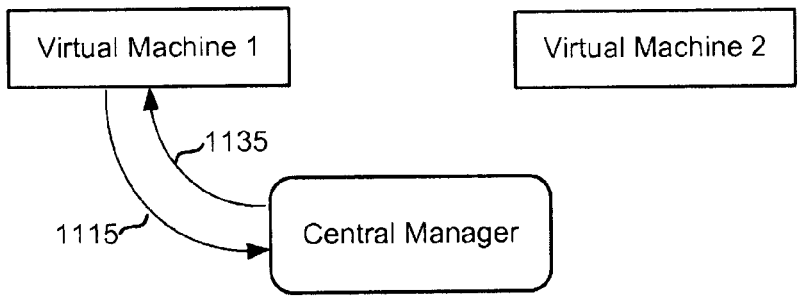
FIGS. 11B-11D illustrate the signaling occurring in FIG. 11A.
Figure 11C:
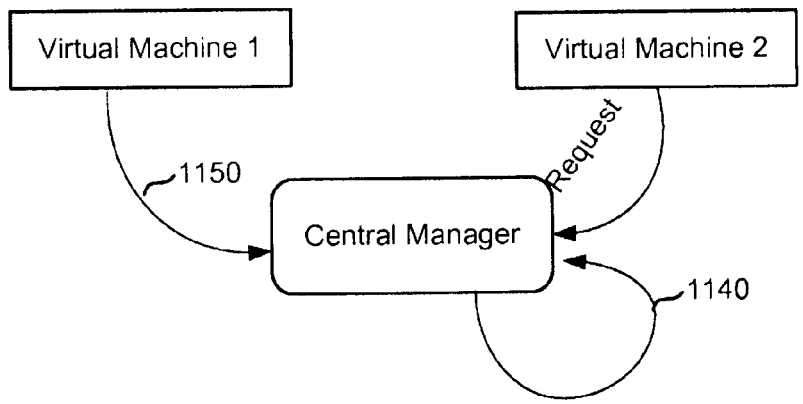
Figure 11D:
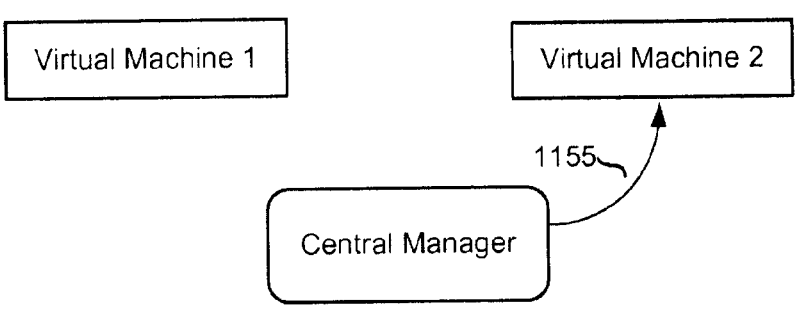
Figure 12A:
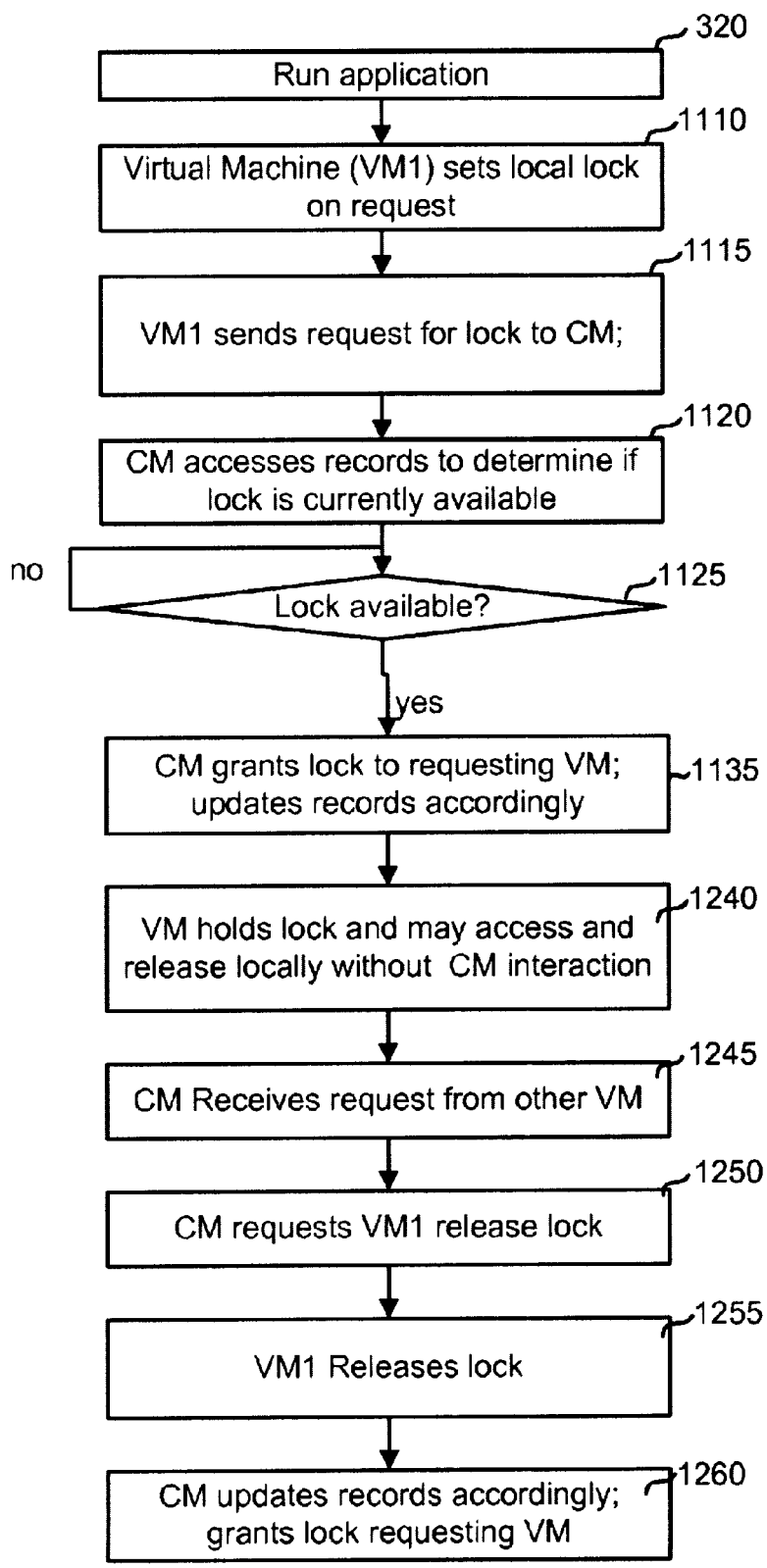
FIG. 12A illustrates a method for providing greedy locking.
Figure 12B:
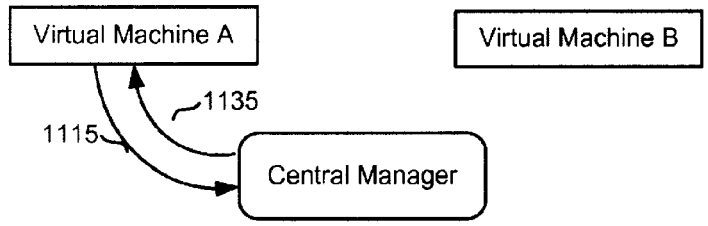
FIGS. 12B-12D illustrate the signaling occurring in FIG. 12A.
Figure 12C:
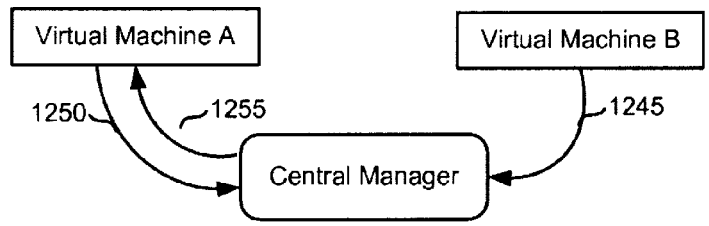
Figure 12D:
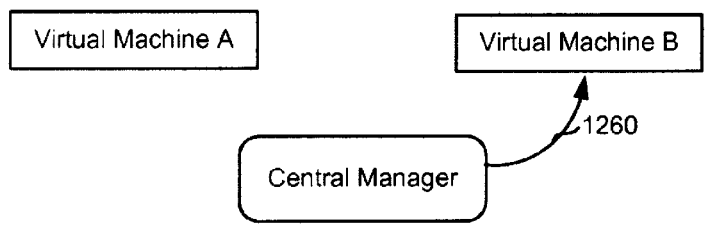

FIG. 12A is equivalent to FIG. 11A up to step 1135. FIG. 12A may be read in conjunction with illustrations in FIGS. 12B-12D. Once a greedy lock is granted to VM1, at step 1240, VM1 holds the lock and may access and release the lock locally without CM interaction. At step 1245, the CM receives a request for the lock from another VM. At step 1250, the central manager will request that VM1 release the lock and when VM1 releases the lock at step 1255, the CM updates its records accordingly at step 1260 and grants the lock to the requesting VM.

Figure 12E:
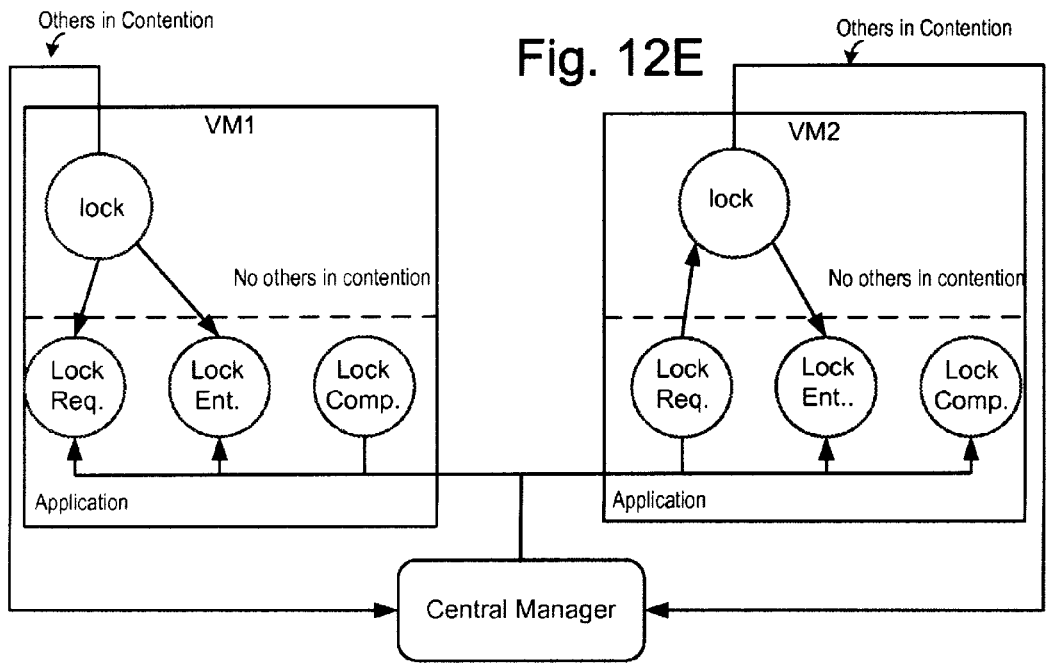
FIG. 12E is a state machine description of the method of FIG. 12A.

FIG. 12E shows a greedy lock state machine. This diagram uses two VMs as a simplification. The state may be initialized at the Lock Requested state in VM1. The sole exit transition is to the lock state maintained in the central manager. Two transitions can exit this state, No Others In Contention, meaning no other virtual machines are in contention for the lock, or Others in Contention, meaning other virtual machines are in contention for the lock. If the No Others In Contention state is true, the VM will transition to the Lock Entered state, transition to the Lock Complete state, and back to the Lock Requested state. From here the transitions and states remain the same for VM1, in a loop, until such point where another VM requests the lock and the Others In Contention transition is followed out of the Lock Requested state to the Blocked state on the central manager. At this point the Central Manager blocks the VM1 from moving to another Lock Entered state and instead hands the Greedy Lock to the VM2. VM1, which then can enter its own series of Lock Requested—check Lock—Lock Entered—Lock Complete state transitions until another VM requests the greedy lock.

The following pseudo-code provides a further illustration of the concepts described herein. Assume the following pseudo-code represents application code which has been instrumented in accordance with the discussion of step 305. In this example, a new thread is adding a new object and the agent will traverse the graph of the person object and make all the objects it refers to managed and give them all object IDs. A record of these new objects is placed into the transaction log which will be forwarded to the central manager. Note that each VM gets a batch of central manager level object IDs ahead of time so that it can assign them to the objects. For example, each VM may get any number of new object IDs that it can assign locally at will. If it runs out of object IDs, it can request additional IDs from the central manager. Also note that the VM's internal object ID does not affect the central manager or the central manager level Object ID. The code below may be operated on by a thread on any virtual machine.

```
Class Cache {
/* Define the object "cache" */
    Map myCache=new HashMap( )
        /*Define the object "myCache" as a empty HashMap*/
            public void put(String name, User user) {
                /* Call the "put" method */
                synchronized(myCache) {
                    /* Request lock on myCache at virtual machine */
                    lockManager.getLock(myCache)
                        /* Request lock on myCache from central
                        manager (this code is added by instrumentation) */
                    transactionManager.startTransaction( )
                        /* Start a transaction at the virtual machine
                        (this code is added by instrumentation) */
                    myCache.put(name, user)
                        /* Call the put method for "myCache" */
                    transactionManager.commitTransaction( )
                        /* Commits the transaction log to the central
                        manager (this code is added by
                        instrumentation )*/
                    lockManager.releaseLock(myCache)
                        /* Release the lock on myCache at virtual
                        machine (this code is added by instrumentation) */
                }
            }
    }
```

First, assume that at VM1 there are two threads active both asking for a lock on the object "myCache". In this example, the object myCache has been identified as a managed object. A first thread will be granted the lock by virtual machine VM1. Next, the data sharing agent indicates to the central manager that there is a thread on VM1 that has requested a lock on myCache. The agent requests a lock from the server. If no other virtual machine has the lock, the central manager will grant the lock to the VM.

At this point, the application code at VM1 is able to move on. In the virtual machine, the agent starts a transaction for this thread. The agent will now keep track of logical actions and field changes to managed objects performed by thread one. This occurs whenever a thread obtains a lock on a managed object.

Once this first thread has received a lock and started its transaction, now it is able to execute the operations in the protected block of code as originally defined by the application code. Suppose, for example, a second VM with another thread trying to execute the same block of code protected by the same lock on a different virtual machine. There are now two threads locally that are synchronized by VM1, and a third thread on VM2 trying to access the same object. The native lock manager of VM2 will allow this lock, but when the function "getLock" is performed on VM2, the central manager will not grant VM2 the lock because it is already held by thread one in VM1.

Threads two and three are blocked trying to get a lock. Thread two is on the same VM as thread one, so it is blocked trying to get the VM1 object monitor from the native lock manager of VM1. Thread three has been given the local monitor on VM2 but is blocked trying to get the clustered lock from the central manager.

The application code can then perform the put operation (in this example) on the object once the lock is granted. Once this is completed, the transactionmanager.committransaction( ) takes the log built up in the transaction and ships it to the central manager. Next, since thread one is finished with the lock, the lockManager.releaseLock(myCache) releases the clustered lock. Thread one exits the protected block of code and has now completed its work.

Once thread one in VM1 has released the local lock, the native lock manager in VM1 allows thread two to obtain the local lock. If the central manager grants thread two the clustered lock, thread two executes the same block of code against another user object. While that is happening, thread three at VM2 is still blocked in contention for the clustered lock from the server, even though it has been granted the local lock by the native lock manager in VM2. Thread three remains blocked until thread two completes its execution of the protected block of code and releases the lock. At such time, the central manager awards the clustered lock to thread three in VM2. Because thread three is in a separate VM than threads one and two, the transactions created by threads one and two must be applied, in order, at VM2 to bring the changed managed objects up to date before thread three is allowed to execute the protected block of code. Once the transactions created by VM1 under the scope of the clustered lock have been applied in VM2, thread three is allowed to execute the protected block of code. When thread three has completed the protected block of code, the transaction it created is committed and the clustered lock is released by thread three. The clustered lock returns to its uncontended state.

Figure 13:
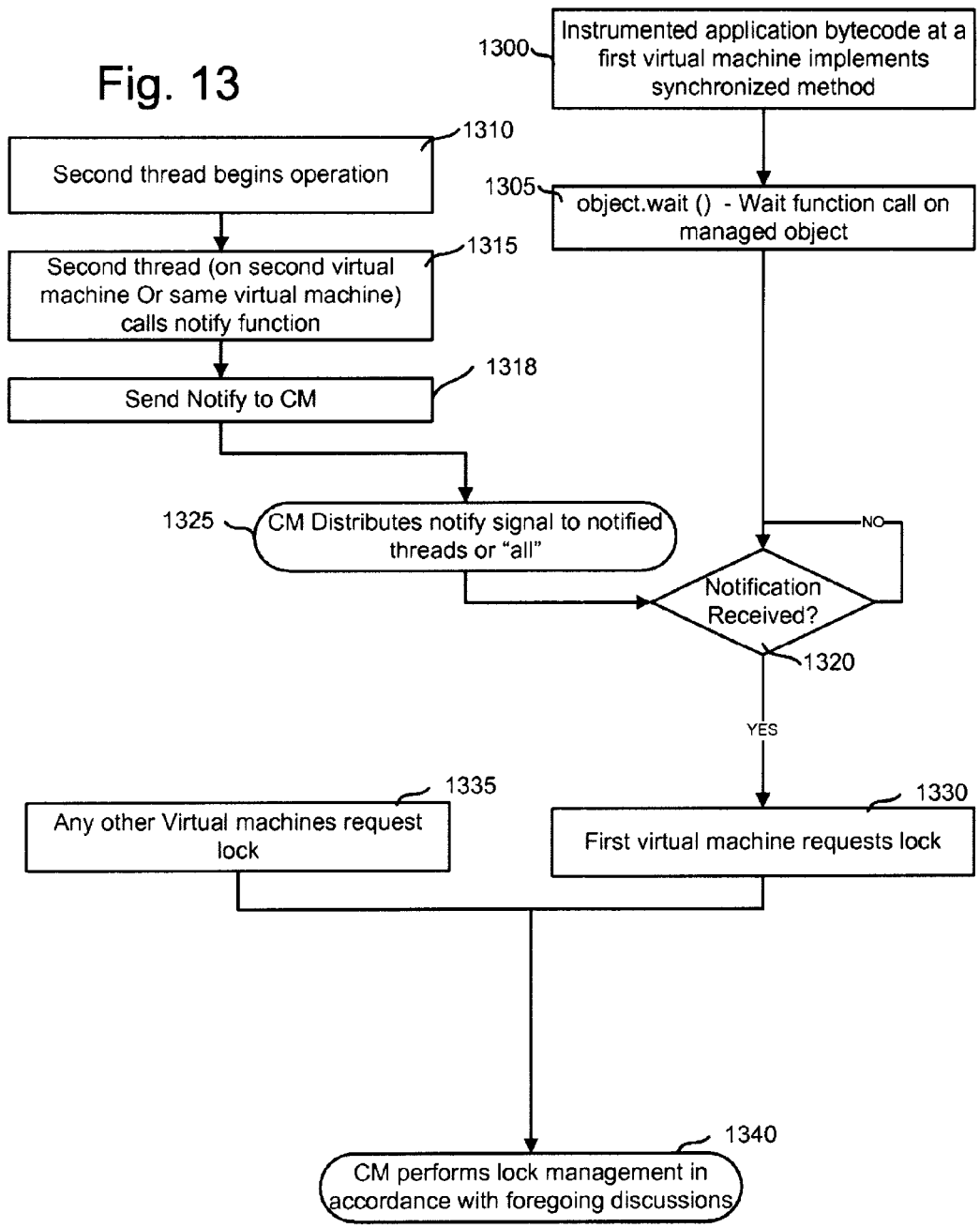
FIG. 13 illustrates a method for distributing thread signaling amongst virtual machines in a cluster.

FIG. 13 illustrates a method for signaling between threads in separate virtual machines by extending thread signaling mechanisms built into the virtual machine to have a clustered meaning. In a unique aspect of the technology, thread signaling, such as object.wait( ) and object.notify( ) and thread.join( ) methods in the Java Virtual Machine, is extended to apply to all threads in all virtual machines in the cluster. As mentioned previously, synchronization of multiple threads on a single virtual machine is conventionally achieved using locks that allow only one of the threads in that virtual machine to execute a protected block of code at a time. As mentioned previously, this conventional locking is extended to have a clustered meaning. In addition, a technique is required for signaling waiting threads which may be distributed across different virtual machines.

For example, if a thread currently holds the lock on an object, it may call "object.wait( )" which causes the calling thread to release that object's lock and pause execution. Another thread may then acquire the lock on that object. It may then call the Java method "object.notify( )" which will notify a single thread waiting on that object. It may also call the Java method "object.notifyAll( )" which will notify all threads waiting on that object. Waiting threads that are notified in this way resume execution and go back into active contention for that object's lock. While this is satisfactory in a single-virtual machine environment, a technique is needed for signaling threads on different virtual machines to coordinate the pausing and resuming of thread execution. A technique is needed for extending existing thread signaling mechanisms such as Java's "object.wait( )" and "object.notify( )" methods to apply to all threads in all virtual machines in the cluster as they do to threads in the same virtual machine. See, for example, http://java.sun.com/docs/books/jls/third_edition/html/memory.html#17.8 An example of such a technique follows.

In a unique aspect of the technology, the native thread signaling utilities of a virtual machine are extended to the cluster. These can include, in a Java context, synchronization (grabbing the lock in the first place), wait and notify, the Thread.join( ) method, and the like. In other virtual machine contexts, other thread signaling technologies may be extended.

In FIG. 13, this feature of the technology is described with respect to the object.wait( ) and object.notify( ) utilities, but the technology is not limited to these signaling utilities. At block 1300, instrumented application byte code running in a thread at a first virtual machine implements a synchronized call on managed object. After performing one or more operations defined in the application code, an object.wait( ) call is encountered in the code at step 1305. The thread will now release the lock it has on that object, pause execution and await notification at step 1320. Another thread may then acquire that object's lock. This thread may be on the same virtual machine as that of steps 1300 or, in accordance with the technology, a different virtual machine. At step 1315, the second thread calls object.notify( ) and, assuming that the thread is executing on a different virtual machine, the notify signal is passed to the central manager at step 1318. At step 1325, the central manager distributes the notify signal to a waiting threads or all waiting threads.

Once the notification is sent, step 1320 is true and the first thread will then request access to a lock at step 1330. Any other threads which were waiting on the notification will likewise resume execution and request access to the lock at step 1335. At step 1340, the central manager will perform lock management in accordance with the foregoing discussions.

Note that while example implementations are discussed in which virtual machines run on servers, which is a suitable approach for storing large amounts of data for a web-based application for instance, any type of computing device may be used, including personal computers, minicomputers, mainframes, handheld computing devices, mobile computing devices, and so forth. Typically, these computing devices will include one or more processors in communication with one or more processor readable storage devices, communication interfaces, peripheral devices, and so forth. Examples of storage devices include RAM, ROM, hard disk drives, floppy disk drives, CD ROMS, DVDs, flash memory, and so forth. Examples of peripherals include printers, monitors, keyboards, pointing devices, and so forth. Examples of communication interfaces include network cards, modems, wireless transmitters/receivers, and so forth. In some embodiments, all or part of the functionality is implemented in software, including firmware and/or micro code, that is stored on one or more processor readable storage devices and is used to program one or more processors to achieve the functionality described herein.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer-implemented method for allowing different instances of an application to execute in different virtual machines, comprising:
   providing a clustering agent interfacing with a plurality of virtual machines, each virtual machine running at least one instance of the application, each instance of the application accessing a plurality of objects;
   configuring one or more managed objects selected from the plurality of objects, the managed objects comprising a subset of the plurality of objects, said configuring identifying operations which may affect the one or more managed objects in a each instance of application on each virtual machine;
   detecting application operations performed on the one or more managed objects by any instance of the application which affect state information of the managed objects; and
   communicating the application operations detected in one application instance in one virtual machine to a central manager for use in replicating the managed object state information to others of said virtual machines.

2. The computer-implemented method of claim 1, wherein: the step of configuring comprises defining a root object identifying and child objects which can be reached from the at least one root object.

3. The computer-implemented method of claim 2, wherein: the state information is replicated by updating a local instance of the managed object at the second virtual machine with said operations.

4. The computer-implemented method of claim 1, wherein the operations comprise method calls.

5. The computer-implemented method of claim 1 wherein the operations comprise field set operations.

6. The computer-implemented method of claim 1, wherein the step of identifying includes:
   instrumenting byte code of each instance of the application to perform the steps of identifying and detecting.

7. The computer implemented method of claim 1 wherein the step of identifying includes providing the virtual machine with a facility to incorporate the configuration and output operations affecting the state of a managed object.

8. A computer-implemented method for maintaining consistent data at different virtual machines, comprising:
   providing one or more clustering agents interfacing with a plurality of virtual machines, each of the plurality of virtual machine interfacing with a local instance of an application associated with the virtual machine, each application accessing a plurality of objects at the virtual machine;
   receiving application operations describing events affecting a local instance of a managed object state from any one of the virtual machines at a central controller;
   creating a representation of each of the managed objects using the application operations at the central controller, the representation describing the object state; and
   communicating update operations describing the detected operations on the managed object to others of said plurality of virtual machines to replicate the managed object state in a local instance of the managed object on others of the virtual machines.

9. The computer-implemented method of claim 8, wherein: the managed objects are identified by an object graph at one of the virtual machines which includes at least one root object and objects reachable from the at least one root object.

10. The computer-implemented method of claim 9, wherein:
    the application operations comprise field set operations.

11. The computer-implemented method of claim 8, wherein:
    the application operations comprise method calls.

12. The computer-implemented method of claim 8, wherein:
    the managed objects are identified and detected by instrumented byte code of each instance of the application.

13. The computer implemented method of claim 8 wherein the managed objects are identified by the virtual machine having a facility to incorporate the configuration and output operations affecting the state of a managed object.

14. The computer-implemented method of claim 8 further including the steps of:
    receiving application operations describing a local instance of a managed object state from at least two of the virtual machines.

15. A computer-implemented method for maintaining consistent data at different virtual machines, comprising:
    providing a clustering agent interfacing with a plurality of virtual machines, each of the plurality of virtual machine interfacing with a local instance of an application associated with the virtual machine, each application accessing a plurality of objects at the virtual machine;
    on any one of the virtual machines,
        identifying operations which may affect state in one or more managed objects in a first instance of an application on the one of the virtual machines;
        detecting application operations performed on the one or more managed objects by the first instance of the application which affect the state information; and
        communicating the application operations to a central manager for use in replicating the managed object state information at other virtual machines, and
    on the central manager,
        creating a representation of each of the managed objects using the application operations, the representation describing the object state; and
        communicating update operations detected in one application instance in one virtual machine describing the object state information to at least a second virtual machine to replicate the managed object state in a local instance of the managed object on the second virtual machine.

16. The computer-implemented method of claim 15, wherein:
    the step of identifying includes defining a root object and generating an object graph at at least one virtual machine which includes the root object and objects reachable from the root object.

17. The computer-implemented method of claim 16, wherein:

the state information is replicated by updating local objects at the second virtual machine using the application operations.

18. The computer-implemented method of claim 15, wherein the operations comprise method calls.

19. The computer-implemented method of claim 15 wherein the operations comprise field set operations.

20. The computer-implemented method of claim 15, wherein the step of identifying comprises:

instrumenting byte code of the first instance of the application to perform the steps of identifying and detecting.

21. The computer implemented method of claim 15 wherein the step of identifying includes providing the virtual machine with a facility to incorporate the configuration and output operations affecting the state of a managed object.

* * * * *